March 26, 1963 R. J. BROADWELL 3,083,026
HYDRO-PNEUMATIC VEHICLE SUSPENSION SYSTEM
Filed Nov. 4, 1959 9 Sheets-Sheet 1

INVENTOR
ROBERT J. BROADWELL

BY Cushman, Darby & Cushman
ATTORNEYS

March 26, 1963 R. J. BROADWELL 3,083,026
HYDRO-PNEUMATIC VEHICLE SUSPENSION SYSTEM
Filed Nov. 4, 1959 9 Sheets-Sheet 2

INVENTOR
ROBERT J. BROADWELL

BY Cushman, Darby & Cushman
ATTORNEYS

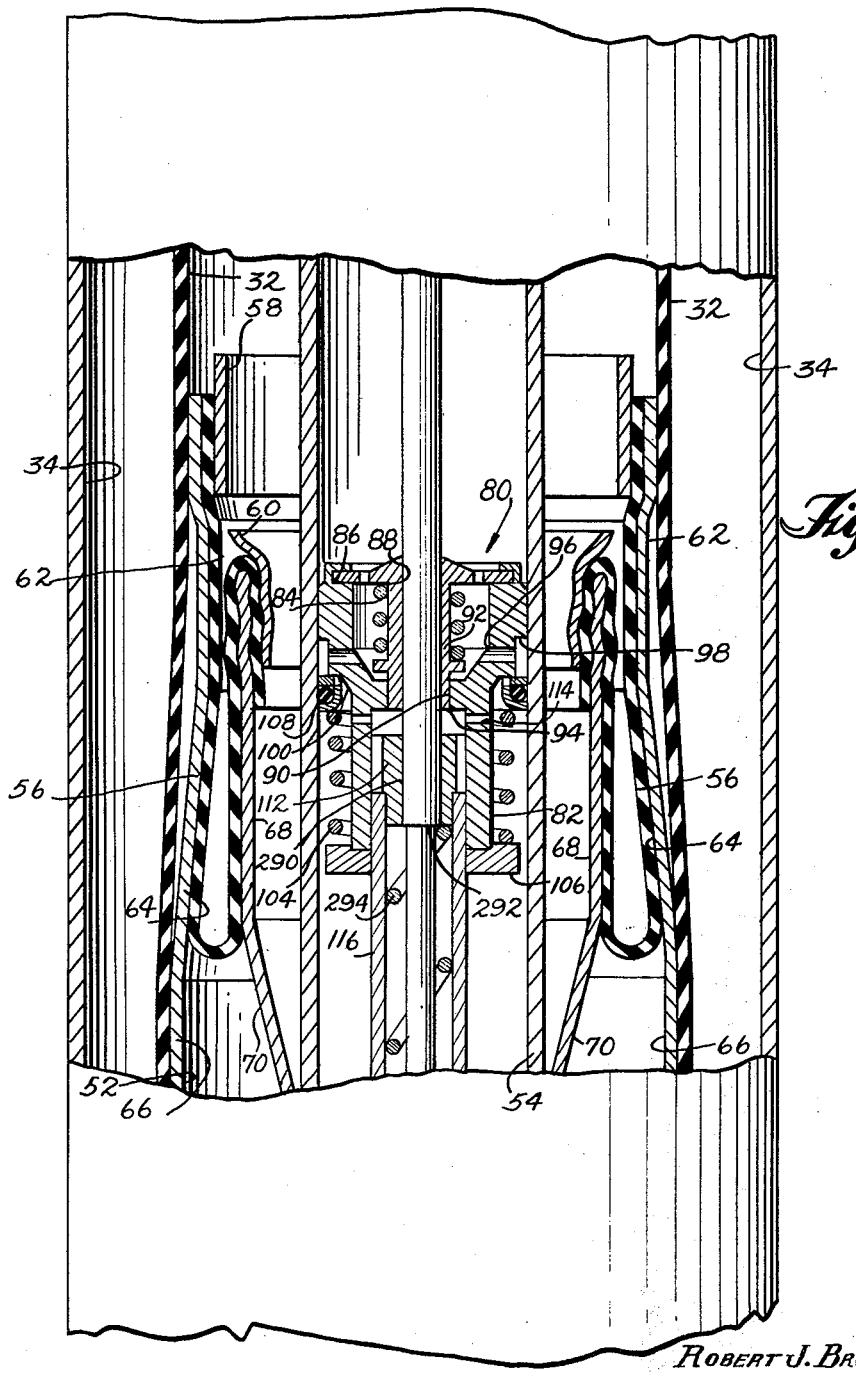

March 26, 1963 R. J. BROADWELL 3,083,026
HYDRO-PNEUMATIC VEHICLE SUSPENSION SYSTEM
Filed Nov. 4, 1959 9 Sheets-Sheet 4

INVENTOR
Robert J. Broadwell
BY Cushman, Darby & Cushman
ATTORNEYS

March 26, 1963  R. J. BROADWELL  3,083,026
HYDRO-PNEUMATIC VEHICLE SUSPENSION SYSTEM
Filed Nov. 4, 1959  9 Sheets-Sheet 5
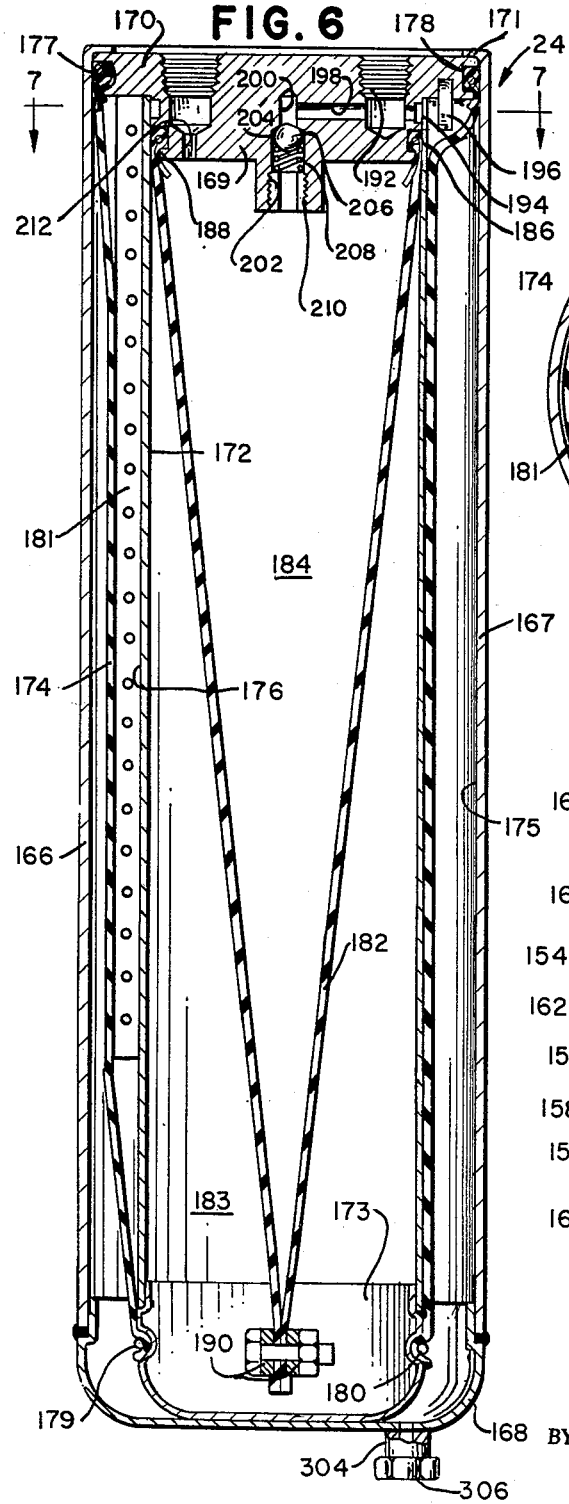
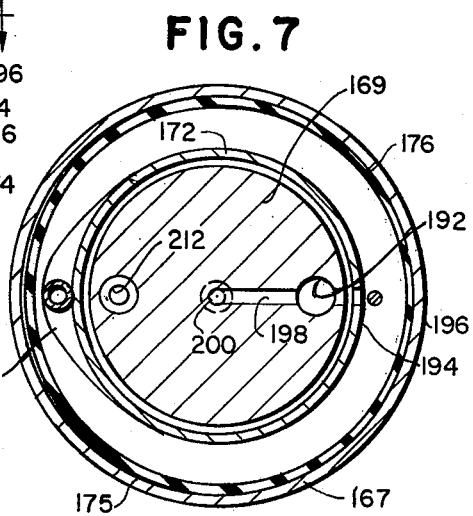
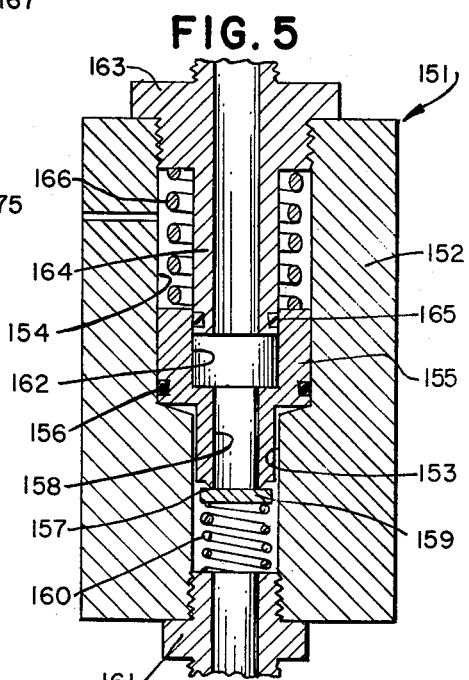
INVENTOR
ROBERT J. BROADWELL
BY Cushman, Darby & Cushman
ATTORNEYS March 26, 1963　　　R. J. BROADWELL　　　3,083,026
HYDRO-PNEUMATIC VEHICLE SUSPENSION SYSTEM
Filed Nov. 4, 1959　　　　　　　　　　　9 Sheets-Sheet 6

INVENTOR
ROBERT J. BROADWELL

BY Cushman, Darby & Cushman
ATTORNEYS

March 26, 1963   R. J. BROADWELL   3,083,026
HYDRO-PNEUMATIC VEHICLE SUSPENSION SYSTEM
Filed Nov. 4, 1959   9 Sheets-Sheet 7

INVENTOR
ROBERT J. BROADWELL
BY Cushman, Darby & Cushman
ATTORNEYS

March 26, 1963  R. J. BROADWELL  3,083,026
HYDRO-PNEUMATIC VEHICLE SUSPENSION SYSTEM
Filed Nov. 4, 1959  9 Sheets-Sheet 8
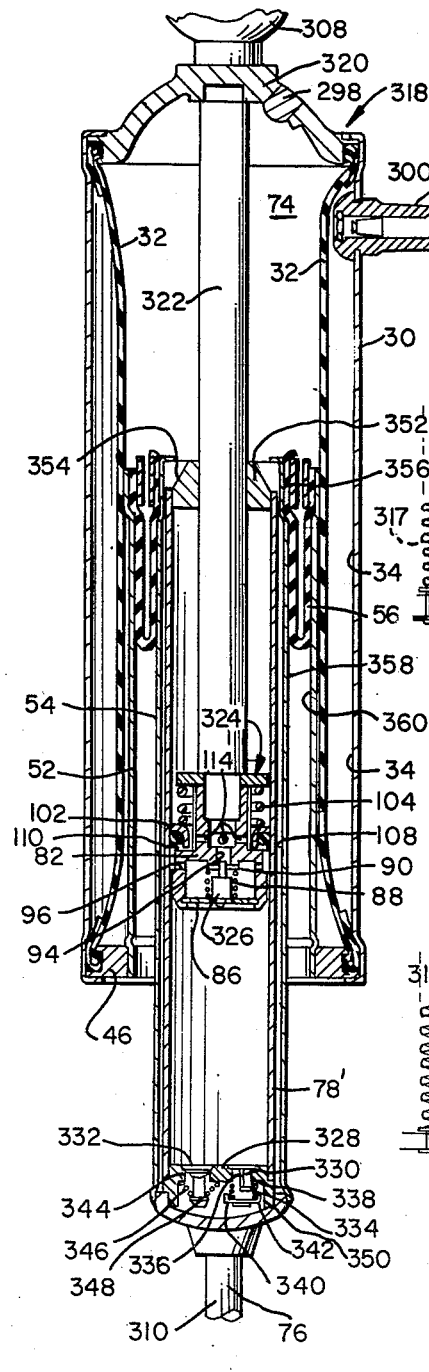
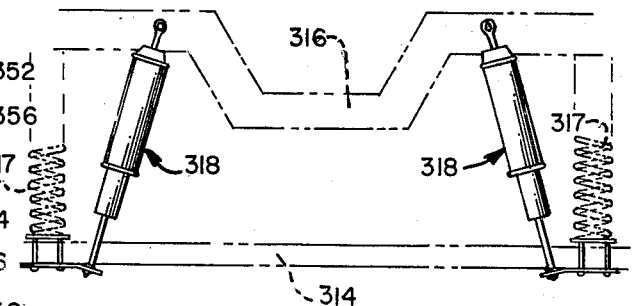
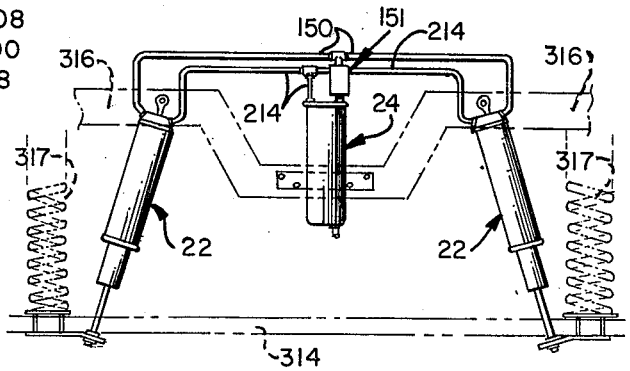
INVENTOR
ROBERT J. BROADWELL
BY Cushman, Darby & Cushman
ATTORNEYS March 26, 1963 R. J. BROADWELL 3,083,026
HYDRO-PNEUMATIC VEHICLE SUSPENSION SYSTEM
Filed Nov. 4, 1959 9 Sheets-Sheet 9

INVENTOR
ROBERT J. BROADWELL
BY Cushman, Darby & Cushman
ATTORNEYS

United States Patent Office 3,083,026
Patented Mar. 26, 1963

3,083,026
HYDRO-PNEUMATIC VEHICLE SUSPENSION SYSTEM
Robert J. Broadwell, Cleveland, Ohio, assignor to The Gabriel Company, Cleveland, Ohio, a corporation of Ohio
Filed Nov. 4, 1959, Ser. No. 850,957
27 Claims. (Cl. 280—6)

This invention relates to vehicle suspensions and more particularly to vehicle suspensions of the hydro-pneumatic type.

In the broadest sense, the present invention contemplates the provision of a high pressure reservoir for storing hydraulic fluid under pressure and a pump arranged to be actuated by relative movement between the sprung and unsprung masses of the vehicle, during its travel, for supplying hydraulic fluid under pressure to the reservoir. The high pressure fluid stored and maintained in the reservoir as a result of the travel of the vehicle is, in accordance with the present invention, preferably utilized to maintain the unsprung mass of the vehicle in a predetermined vertical relation with respect to the unsprung mass, as by a self-leveling hydro-pneumatic strut. It will be understood, however, that it is within the contemplation of the present invention to actuate other hydraulic devices through the energy of the fluid under pressure stored and maintained in the hydraulic reservoir. For example, the high pressure reservoir of the present invention could be utilized in a power brake system, a power steering system, and other power assists utilized on vehicles for moving instrumentalities such as windows, seats, windshield wipers, convertible tops and the like.

Accordingly, it is an object of the present invention to provide a hydraulic pump and reservoir assembly for a vehicle which is capable of converting the energy of relative movement between the sprung and unsprung masses of a vehicle during travel into hydraulic pressure energy and of storing such hydraulic pressure energy.

Another object of the present invention is to provide a hydraulic pump and reservoir assembly of the type described having means within the pump for damping the relative movement between the sprung and unsprung masses of the vehicle during travel.

Still another object of the present invention is the provision of a hydraulic pump and reservoir assembly of the type described having means for maintaining a constant back pressure on the pump without regard to changes in pressure in the reservoir.

A further object of the present invention is the provision of a hydraulic pump and reservoir assembly of the type described having means embodied in the pump for converting the energy of relative movement between the sprung and unsprung masses of the vehicle during both the upward and downward movements of the sprung mass relative to the unsprung mass.

Hydro-pneumatic struts which are operable to maintain the sprung mass of a vehicle in predetermined vertical relation with respect to the unsprung mass thereof are known. In a conventional non-self-leveling suspension system, the vehicle frame or sprung mass will assume different vertical positions with respect to the unsprung mass as a result of the variance in static load placed thereon. Self-leveling hydro-pneumatic strut suspensions overcome this disadvantage. However, it must be noted that when the vehicle frame is loaded, as by a passenger boarding the vehicle or the like, the frame will tend to move downwardly under such load, and in order to raise the frame through the hydro-pneumatic strut, fluid energy must be available to accomplish this purpose. It has been proposed to utilize for this purpose the fluid energy created as a result of the relative vertical movement between the sprung and unsprung masses of the vehicle. However, these proposals have not been entirely successful for the reason that they were operable only when the vehicle is in motion. Thus, with these arrangements, if the vehicle is statically loaded while at rest, which is usual when passengers are boarding the same, the frame would be moved downwardly and would not be elevated to its normal predetermined position until after the vehicle has traveled for a distance sufficient to create enough fluid energy to raise the vehicle frame.

It has also been proposed to provide a pump for the hydro-pneumatic strut which pump is operated from the engine of the vehicle. Here again, this arrangement is not entirely effective since it must depend upon the engine being operated in order to elevate the vehicle to its normal position after a static load has been imposed thereon. Moreover, this system is considerably expensive and does not take advantage of the energy normally dissipated by relative movement between the sprung and unsprung masses of the vehicle during travel. On the contrary, a pump driven by the engine merely consumes additional power from the engine that may be needed elsewhere.

The present invention overcomes the disadvantages of the self-leveling hydro-pneumatic strut suspensions mentioned above by utilizing the high pressure reservoir to store the energy created as a result of the relative movement between the sprung and unsprung masses of the vehicle during travel.

Accordingly, it is another object of the present invention to provide a hydro-pneumatic suspension system embodying hydro-pneumatic struts for supporting the load of the vehicle, a pump damper between the sprung and unsprung masses of the vehicle operable to pump hydraulic fluid under pressure to a high pressure hydraulic fluid reservoir, the reservoir being connected with the hydro-pneumatic strut through a position responsive valve mechanism to effect self-leveling thereof.

Still another object of the present invention is the provision of a self-leveling hydro-pneumatic suspension system of the type described in which the component elements of the system are hydraulically interconnected with the use of a minimum number of hydraulic lines.

Still another object of the present invention is the provision of a self-leveling hydro-pneumatic suspension system having an improved hydro-pneumatic strut, such strut having embodied therein a pump damper for supplying hydraulic fluid under pressure to a high pressure hydraulic reservoir.

Still another object of the present invention is the provision of a self-leveling hydro-pneumatic suspension system of the type described having an improved hydraulic fluid reservoir assembly, such assembly having a high pressure chamber and a low pressure chamber embodied therein.

While the present invention provides a complete self-leveling hydro-pneumatic suspension for a vehicle, the component elements of the present system may be readily employed as assist units in conventionally suspended vehicles. As already mentioned, the pump and reservoir units can be separately utilized to provide hydraulic pressure energy to operate any hydraulically operated unit on the vehicle. In a like manner, the hydro-pneumatic strut and pump damper units can be employed as auxiliary equipment in a conventional vehicle suspension either with the reservoir unit where automatic self-leveling is desired or without the reservoir unit where automatic self-leveling is not necessary.

The use of the present system as auxiliary equipment on conventionally suspended vehicles provides many advantages, particularly with reference to the new longer and lower passenger automobiles. The conventional suspension systems of such cars are usually designed to operate at optimum performance with average loads, as for example, from one to three passengers. Where unusually heavy loads are carried, such as baggage and other articles in the rear trunk compartment, a full three passengers in the rear seat, and trailers and the like connected to the rear bumper, the suspension system may "bottom out" too frequently during travel or permit the rear end of the frame to ride too low causing the headlight beams to be thrown up and presenting problems of road clearance. The problem of road clearance is particularly acute in connection with automobiles of the type having large rear overhanging structures which touch and scrape the street when going in and out of steep driveways and the like.

The present system utilized as auxiliary equipment on the rear end of such conventionally suspended vehicles serves to eliminate the problems incident to the frame riding too low. Where the reservoir unit is utilized with the hydro-pneumatic strut and pump damper units, self-leveling of the frame is automatically accomplished so that for any load, whether unusually heavy or not, the frame will be maintained at a desired constant riding height. Even without the use of the reservoir unit and the position responsive leveling valve mechanism, the hydro-pneumatic strut and pump damper units provide an effective means for supporting unusually heavy loads in such a way that the frame will not ride too low. Moreover, the hydro-pneumatic strut of the present invention when so utilized may be conveniently adjusted by means of air pressure to achieve a constant riding height for different loads.

Accordingly it is an object of the present invention to provide a load supporting hydro-pneumatic strut of the type described which may be utilized in conjunction with conventional suspension systems to prevent the sprung mass of the vehicle from riding too low under heavy static loads.

A further object of the present invention is the provision of load supporting hydro-pneumatic strut of the type described having means operable in conjunction therewith for automatically maintaining the sprung mass of the vehicle in a predetermined riding height.

Still another object of the present invention is the provision of a load supporting hydro-pneumatic strut of the type described operable to support unusually heavy loads so that the sprung mass of the vehicle will not ride too low, such strut having means for adjusting the height at which the sprung mass is supported for any given load thereon.

Still another object of the present invention is the provision of a load supporting hydro-pneumatic strut of the type described having improved hydraulic seal means embodied therein.

Still another object of the present invention is the provision of a load supporting hydro-pneumatic strut of the type described which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 2C is an enlarged fragmentary view of part of the structure illustrated in FIGURE 2A;

FIGURE 5 is an enlarged vertical sectional view of the back pressure control valve of the present invention;

FIGURE 6 is a vertical sectional view of the reservoir unit;

FIGURE 7 is a cross-sectional view taken along the line 7—7 of FIGURE 6;

FIGURE 12 is a fragmentary elevational view illustrating the manner in which the units of the present system can be utilized in conjunction with a conventional suspension to effect automatic self-leveling;

FIGURE 13 is a view similar to FIGURE 12 illustrating the manner in which the hydro-pneumatic strut and pump damper unit of the present system can be utilized by itself in a conventional suspension system;

FIGURE 14 is a vertical sectional view of a modified form of a combined hydro-pneumatic strut and pump damper unit embodying the principles of the present invention;

Figure 1:
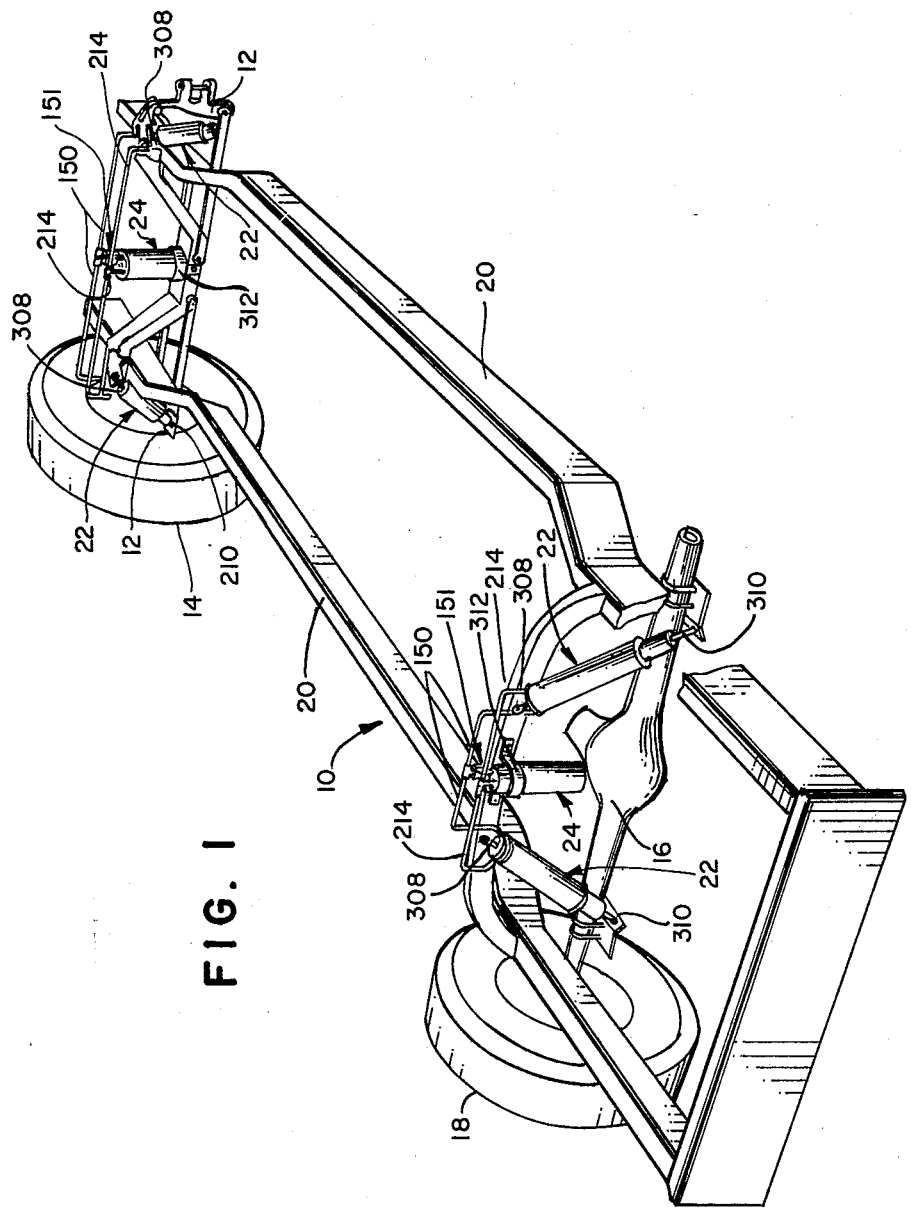
FIGURE 1 is a perspective view of a suspension system embodying the principles of the present invention, showing the arrangement of the same between the sprung and unsprung masses of the vehicles.

Referring now more particularly to the drawings, there is shown in FIGURE 1 a vehicle, generally indicated at 10, having the usual unsprung mass, including front wheel axle mounts 12, front wheels 14, rear axle assembly 16 and rear wheels 18 and the usual sprung mass including a frame structure 20. The sprung mass is suspended on the unsprung mass by a self-leveling hydro-pneumatic suspension system embodying the principles of the present invention. As shown, the self-leveling hydro-pneumatic suspension system includes a combined self-leveling hydro-pneumatic strut and pump damper unit, generally indicated at 22, mounted between the front wheel axle mounts 12 of each front wheel 14 and on opposite sides of the rear axle assembly 16 adjacent each rear wheel 18 and the frame 20. The pair of combined strut and pump damper units 12 adjacent the front and rear wheels are hydraulically connected in parallel with each other and with a reservoir unit, generally indicated at 24.

Figure 2B:
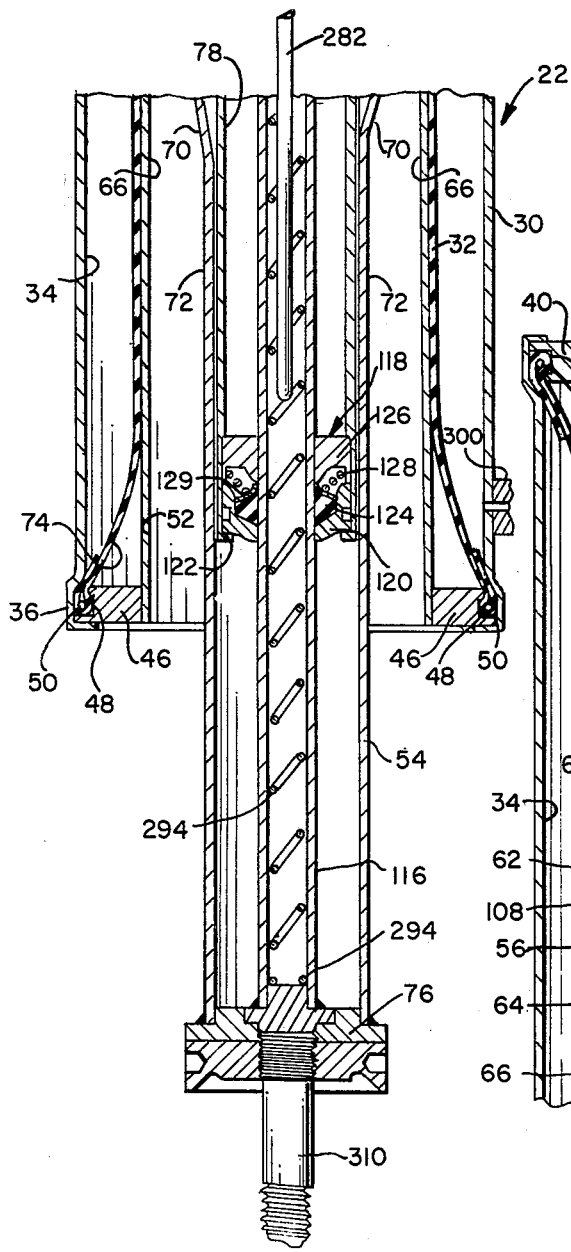
FIGURE 2B is a view similar to FIGURE 2A illustrating the power portion of the combined unit.
Figure 2A:
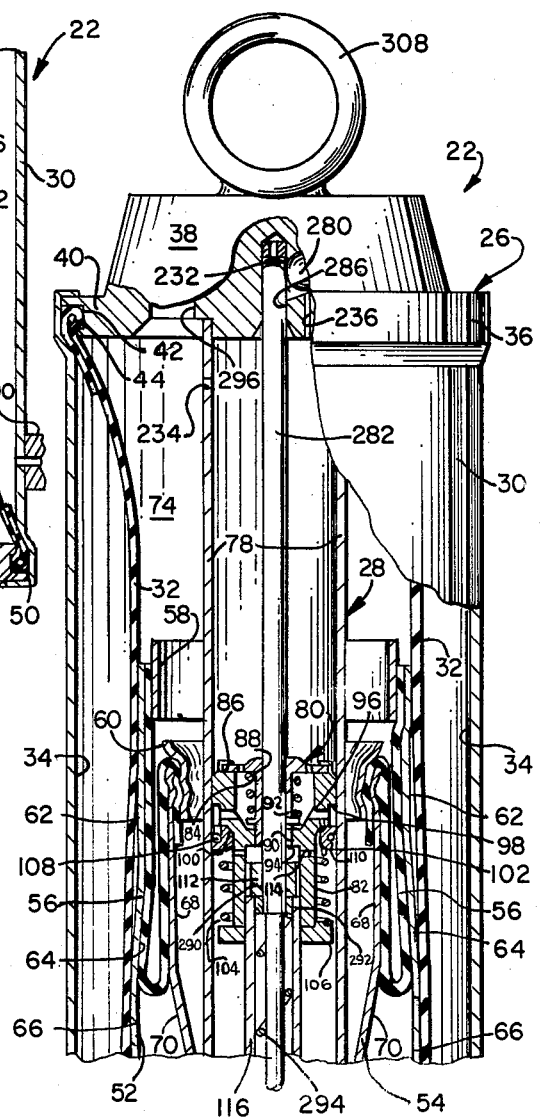
FIGURE 2A is a vertical sectional view of the upper portion of the combined self-leveling hydro-pneumatic strut and pump damper unit of the present invention.
Figure 3:
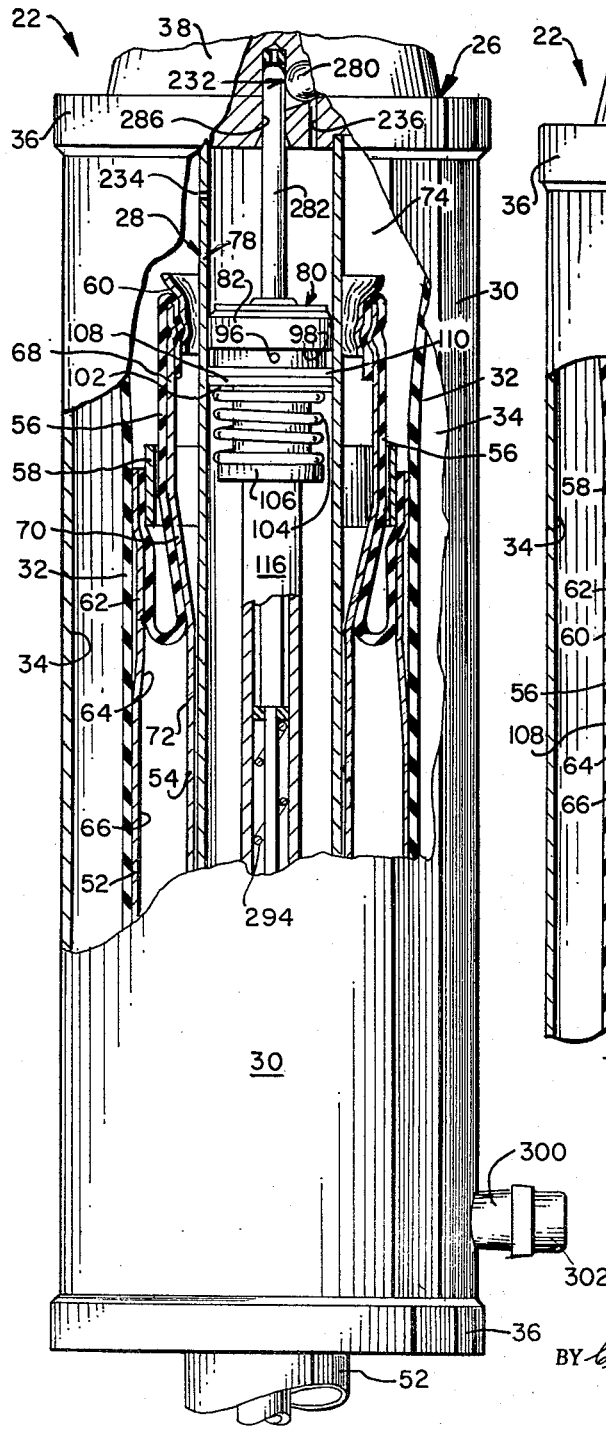
FIGURE 3 is a fragmentary elevational view, partly in section, of the combined self-leveling hydro-pneumatic strut and pump damper unit, showing the position of the parts during compression.
Figure 4:
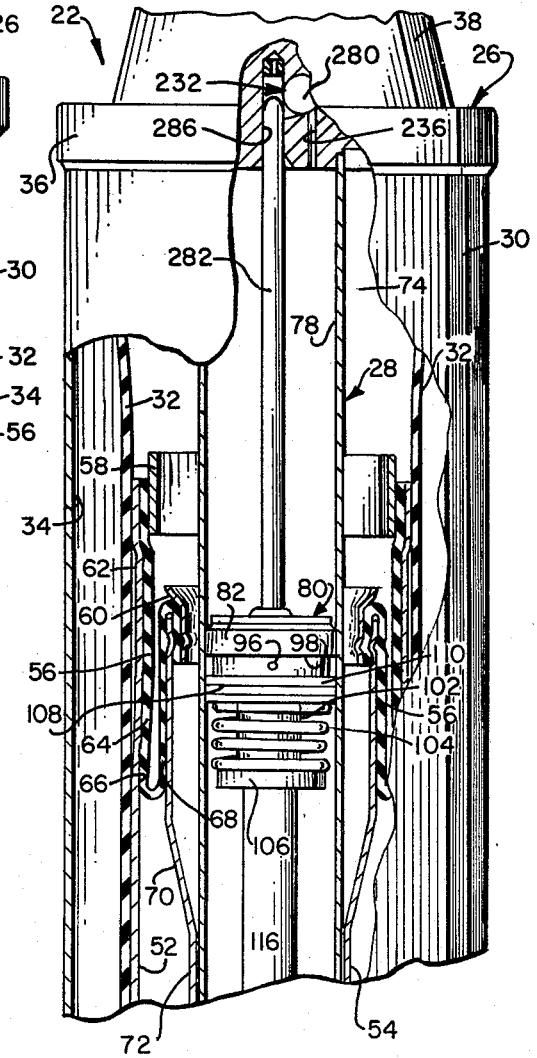
FIGURE 4 is a view similar to FIGURE 3 showing the position of the parts during rebound.

As best shown in FIGURES 2–4, the combined unit 22 includes a hydro-pneumatic strut assembly, generally indicated at 26, and a pump damper assembly, generally indicated at 28, mounted therein. The hydro-pneumatic strut assembly includes an exterior tubular casing member or housing 30 having a sleeve diaphragm 32 of a flexible material, preferably rubber or the like, disposed therein and defining within the casing member an outer annular air chamber 34. The sleeve diaphragm is mounted within the casing member 30, by any suitable means and, as best shown, the ends of the casing member are formed to provide annular channels 36. Mounted within the channel 36 formed at the upper end of the cylindrical member is an end casting or closure member 38 having a peripheral flange 40 formed thereon for engagement within the associated channel 36. An annular groove 42 is formed in the peripheral flange of the closure member for receiving the adjacent end of the diaphragm 32 which is secured in the groove by means of an O-ring seal 44 of conventional construction, the diaphragm end being folded back over the O-ring seal as clearly shown in FIGURES 8 and 9. The securement is completed by turning down the extremity of the channel against the outer edge of the flange.

It will be noted that the inner edge of the channel provides a shoulder which cooperates with the inner edge of the annular flange to grip the folded over end of the sealed diaphragm. Preferably, the extremity of the channel is turned down so as to provide a minimum of 20% and a maximum of 30% rubber compression between the cooperating shoulders.

At the opposite end of the casing member 30 there is provided a ring-shaped end member 46 having an annular groove 48 formed therein similar to groove 42 for receiving the opposite end of the diaphragm. As before, the end of the diaphragm is folded over an O-ring seal 50 and the extremity of the channel is turned down into engagement with the outer edge of the ring-shaped end member to secure the same within the channel and to effect securement and rubber compression of the adjacent end of the diaphragm.

Rigidly secured to the inner periphery of the ring-shaped end member 46, as by welding or the like, is an inner tubular casing member 52 which extends inwardly of the outer casing member within the diaphragm 32. Mounted for longitudinal movement within the inner tubular member 52 is a tubular plunger member 54.

Connected between the adjacent ends of the tubular plunger member 54 and the inner tubular member 52 is a folded rolling sleeve-type seal 56. The seal is preferably made of a sleeve of flexible material such as corded rubber or the like, however, other flexible materials may be utilized. The essential characteristics of the sleeve are that it is impervious to hydraulic fluid, capable of being folded and rolled, and non-resilient so that it will not expand to any considerable extent under pressure. One end of the seal 56 is rigidly secured to the inner end of the inner tubular member 52, as by a metal clamping ring 58, and the opposite end of the sleeve is fixedly secured to the inner end of the tubular plunger member 54, as by a metal clamping ring 60. The sleeve is folded between its secured ends, one ply of the fold engaging the interior surface of the inner tubular member 52 and the other ply of the fold engaging the exterior surface of the tubular plunger member 54.

It will be seen that the length of the folded plies of the sleeve engaging the inner tubular member and tubular plunger member will increase and decrease in response to relative movement between the tubular plunger member 54 and the casing members of the hydro-pneumatic strut assembly. The interior surface of the tubular member 52 which is contacted by the folded sleeve during the relative movement between the plunger member and the cylindrical member includes an inner cylindrical portion 62, an intermediate outwardly-diverging frusto-conical portion 64, and an outer cylindrical portion 66. The surface of the tubular plunger member 54 which engages the folded sleeve includes an inner cylindrical portion 68, an intermediate outwardly converging frusto-conical portion 70, and an outer cylindrical portion 72.

As best shown in FIGURES 2A and 2B with the tubular plunger member in its proper vertical position with respect to the casing members 30 and 52, the fold of the seal 56 is positioned at the intersection between the intermediate and outer portions 64 and 66 of the tubular member and the intermediate and inner portions 70 and 68 of the tubular plunger member. It will be seen that when the plunger member moves inwardly with respect to the casing members or during the compression stroke, as shown in FIGURE 3, the fold will be positioned between the intermediate portions of the members and since they converge inwardly with respect to each other the arc of the fold will increase as the plunger member moves inwardly of the casing members. The effective pressure area of the foldable seal is determined by the center of the arc of the fold so that the effective pressure area of the foldable seal decreases in response to the inward movement of the plunger member with respect to the casing members.

When the plunger member moves outwardly or during the rebound stroke, as shown in FIGURE 4, the fold will be positioned between the outer portion 66 of the interior tubular member and the inner cylindrical portion 68 of the tubular plunger member so that the effective area of the seal remains constant.

The interior surface of the sleeve diaphragm 32, the end members 38 and 46, the exterior surface of the inner tubular member 52, the interior surface of the folded seal 56 and the interior surface of the tubular plunger member 54 define an expansible and contractable hydraulic pressure chamber 74 within the hydro-pneumatic strut. The outwardly extending end of the tubular plunger member is suitably closed by an end casting or closure member 76.

The pump damper assembly 28 of the unit 22 includes a cylinder 78 having one end rigidly secured to the end member 38, as by welding or the like in concentric relation to the outer casing member 30. Mounted within the cylinder is a valved piston, generally indicated at 80, which includes a piston body 82, having an upper hollow portion provided with a periphery for engaging the interior of the cylinder 78. A sleeve 84 is disposed within the hollow portion of the upper end of the piston body and is secured thereto by an integral apertured disk 86. Surrounding the sleeve 84 is a coil spring 88, one end of which engages the disk 86 and the opposite end of which engages a ring-shaped valve member 90. The valve member 90 is adapted to engage an annular seat 92 surrounding a central interior passage 94 formed in the piston body. A plurality of circumferentially spaced passages 96 extend between the upper hollow interior of the piston body radially outwardly to a circumferential groove 98 formed therein. The periphery of the lower portion of the piston body is relieved and provides an annular seat 100 adjacent the annular groove 98. A carrier 102 of L-shaped configuration in cross-section is mounted within the relieved portion of the valve body, as by a coil spring 104, one end of which engages the carrier and the other end of which engages a washer or plate 106 secured to the lower extremity of the piston body. Mounted within the outer periphery of the carrier is a flexible packing 108 and valve ring 110, preferably in the form of an O-ring seal and a flat ring or seal is disposed between the O-ring seal and the valve seat. The lower end of the valve body is provided with a bore 112 communicating with the central passage 94 and a plurality of circumferentially spaced passages 114 extending radially from the bore to the outer reduced periphery of the valve body. Rigidly secured within the lower end of the bore 112 of the piston body is the upper end of a hollow piston rod 116, the lower end of which is rigidly secured to the end plate or member 76.

The plunger member 54 of the hydro-pneumatic strut constitutes one telescopic part of the latter while the casing members 30 and 52 constitute the other. In the pump damper assembly, the cylinder 78 constitutes one telescopic part while the piston 80 and piston rod 116 constitute the other. It will be seen that the telescoping parts of the strut and pump damper move together, that is, the piston 80 will move within the cylinder 78 in conjunction with the relative vertical movement between the plunger member 54 and the casing members 30 and 52 of the hydro-pneumatic strut. During the inward movement of the piston 80 or the compression stroke, hydraulic fluid within the cylinder 78 between the piston and the end member 38 will flow into the upper hollow end of the piston body through the apertured disk 86 and then outwardly through the passages 96 into the annular groove 98, thus moving the flat ring 110 off of the valve seat 100, permitting the fluid to pass into the lower end of the cylinder between the piston 80 and a sealing unit 118 closing the lower end of the cylinder. The sealing unit 118 preferably includes an end closure or plug 120 retained in the lower end of the cylinder by an inwardly turned flange 122 formed on the cylinder. The plug carries a flexible packing ring 124 which surrounds the piston rod and is sealingly pressed against the latter by means of a disk 126 fixed within the lower end of the cylinder and a tapered compression spring 128 mounted between the disk 126 and a compression washer 129 abutting the packing ring 124.

It will be noted that because of the existence of the piston rod in the lower end of the cylinder, more fluid will be displaced from the upper end of the cylinder during the inward movement of the piston than will be needed to fill the lower end of the cylinder. Thus, during the compression stroke, the pump damper assembly is operative to effect displacement of an amount of fluid equal to the area of the piston rod times the length of travel. This displaced fluid, under pressure, is directed to the reservoir unit 24.

When the piston unit moves outwardly with respect to the cylinder or on the rebound stroke, fluid in the lower end of the cylinder passes through the passages 114, and into the bore 112 and through the central passage 94 thus opening the valve 90 against the action of spring 88. This action permits fluid to pass from the lower end of the cylinder to the upper end. Again, because of the differences in volume within the cylinder on opposite sides of the piston due to the presence of the piston rod in the lower end of the cylinder, additional fluid must be supplied to the upper end of the cylinder. The reservoir provides such a supply of low pressure fluid to the upper end of the cylinder during the rebound stroke.

In order to control the flow of high pressure fluid from the cylinder 78 to the reservoir unit 24, there is provided in the end member 38 a longitudinally extending outlet passage 130. (See FIGURE 9.) The inner end of the passage 130 communicates with the inner end of an outwardly extending bore 132 having an inner counterbore 134 formed therein defining a frusto-conical valve surface 136. A valve member 138 is disposed within the counterbore 134 and has mounted thereon an O-ring 140 for engaging the valve seat 136. The valve member 138 is resiliently urged into engagement with the valve seat by means of a coil spring 142, one end of which engages the valve member and the opposite end of which engages the inner end of a threaded nipple 144 engaged within an outer counterbore 146 formed in an intermediate counterbore 148. The outer end of the nipple has fixed thereto one end of a conduit 150, which leads to the reservoir unit 24 and has a back pressure control valve 151 connected in series therewith.

As best shown in FIGURE 5, the back pressure control valve 151 comprises a valve body 152 having a bore 153 extending therethrough. Formed in one end of the bore 153 is a counterbore 154 having a piston member 155 slidably mounted therein. The piston member 155 includes an enlarged upper portion having its outer periphery grooved to receive an O-ring 156 which serves to provide a seal between the outer periphery of the piston member and the inner periphery of the counterbore 154. The lower portion of the piston member is reduced in size to a diameter less than the diameter of the bore 153 and extends into the latter. Formed on the lower extremity of the piston member is an annular valve seat 157 disposed in surrounding relation to a central opening 158 formed in the piston member. The valve seat 157 is arranged to be engaged by a disk valve member 159 which is resiliently urged into engagement with the valve seat by means of a coil spring 160 mounted within the lower end portion of the bore 153 between the disk valve member 159 and a fitting 161 threadedly engaged within the lower extremity of the bore 153.

The enlarged upper portion of the piston member 155 has a cylindrical recess 162 formed therein in communication with the opening 158. A fitting 163 is threadedly mounted within the upper extremity of the counterbore 154 and includes a depending cylindrical portion 164 of a diameter substantially equal to the diameter of the cylindrical recess 162. The lower extremity of the cylindrical portion 164 is slidably mounted within the recess and sealingly engaged therewith, by any suitable means, such as an O-ring 165 engaged within a suitable groove formed in the periphery of the cylindrical portion 164. Mounted between the fitting 163 and the piston member 155 in surrounding relation to the cylindrical fitting portion 164 is a coil spring 166 which serves to resiliently urge the piston member 155 into its lower limiting position as shown in FIGURE 5.

The valve member 159 of the back pressure control valve 151 is operable to permit high pressure fluid from the pump damper assembly to flow into the reservoir unit 24 and to prevent transgression of fluid in the opposite direction. When the hydraulic pressure stored in the reservoir unit increases, the piston member moves upwardly as shown from the position shown in FIGURE 5 against the spring 166 reducing the spring load on spring 160 and thereby reducing the differential pressure required to blow the disk valve member 159 off of the seat 157. The difference in the cross-sectional area of the outer periphery of the piston member 155 and the cross-sectional area of the cylindrical recess 162 is related to the spring rates of the springs 160 and 166 so that the upward movement of the piston member will reduce the loading of the spring 160 sufficient to maintain a constant back pressure in the line to the pump damper assembly without regard to the change in pressure in the reservoir unit. It will be understood that the back pressure control valve 151 may be embodied in the present system as a separate unit, as shown, or may be embodied as an integral part of the reservoir unit 24.

As best shown in FIGURE 6, the reservoir unit 24 includes an outer tubular member or container 167 having an end plate 168 rigidly fixed, as by welding or the like, to one end thereof. Mounted within the opposite end of the housing is an end casting or closure member 169 having an annular flange 170 extending outwardly therefrom for engaging an inturned peripheral flange 171 of the container 167. Rigidly secured to the end member 169 within the container 167 is one end of an inner tubular member 172, the opposite end of which has secured thereto an end plate 173 which, in turn, is secured to the end plate 168 of the housing.

The inner tubular member 172 divides the housing into two annular compartments, the outer compartment constituting a high pressure accumulator and the interior compartment constituting a low pressure sump. Mounted within the outer compartments is a sleeve diaphragm 174 which divides the outer compartment into an outer annular high pressure gas chamber 175 and an inner high pressure hydraulic chamber 176.

The ends of the sleeve diaphragm 174 may be secured within the outer compartment by any suitable means and, as shown, the end of the tubular diaphragm adjacent the end member 169 is folded around an O-ring seal 177 engaging within an annular groove 178 formed in the peripheral flange 170 of the end plate. The opposite end of the sleeve diaphragm 174 is secured to the end plate 173 by an O-ring seal 179 engaged within an annular groove 180 formed in the end plate. Preferably, an elongated bleed tube 181 is positioned within the hydraulic chamber 176 in order to facilitate expansion of the diaphragm upon introduction of hydraulic fluid therein.

Mounted within the sump compartment is an inner sleeve diaphragm 182 which divides the inner compartment into an outer low pressure gas chamber 183 and an inner low pressure hydraulic chamber 184. The diaphragm 182 may be secured within the sump compartment by any suitable means and as shown, the end thereof adjacent the end member 169 is folded over an O-ring seal 186 engaged within an annular groove 188 formed in the end member. The opposite end of the tubular diaphragm is closed by means of a pair of elongated plates 190 suitably fastened together in sealing relation to the end of the tubular diaphragm.

The high pressure conduit 150 coming from the pump damper cylinder 78 is connected with an inlet port 192 formed in the end member 169 of the reservoir unit. The inner end of the port 192 is communicated with the high pressure hydraulic chamber 176 of the accumulator by means of a passage 194 extending therebetween. In order to prevent blockage of the inlet passage to the high pressure hydraulic chamber 176 a dowel pin 196 is secured within the end member and extends downwardly therefrom adjacent the inlet passage 194.

The inlet port 192 is also connected with the low pressure hydraulic chamber 184 of the sump through a passage 198 communicating with a central bore 200 formed in the end member. The bore 200 has a counterbore 202 formed therein which defines an annular valve seat 204. A ball valve 206 is resiliently urged into engagement with the valve seat by a coil spring 208, one end of which engages the ball, the opposite end of which engages a sleeve 210 threaded into the counterbore. The ball valve 206 constitutes a pressure responsive check valve which will open when a predetermined maximum pressure has been obtained in the hydraulic chamber of the accumulator.

In order to supply low pressure fluid from the reservoir unit 24 to the cylinder 78 of the pump damper assembly, an outlet port 212 is formed in the end plate in communication with the low pressure hydraulic chamber 184 of the sump. This port communicates with a low pressure fluid conduit 214 which also is connected with a nipple 216 threadedly engaged within an outer counterbore 218 of a bore 220 formed in the end member 38 of the unit 22. (See FIGURE 9.) The inner end of the nipple 216 is provided with an interior frusto-conical surface defining a valve seat 222. A valve member 224 having an O-ring seal 226 mounted therein is resiliently urged into engagement with the valve seat 222 by a coil spring 228 connected between the valve member and the inner end of the end member 38 defining the bore 220. The inner end of the bore 220 is communicated with the cylinder 78 by means of an inlet passage 230.

From the above, it can be seen that upon the compression stroke of the piston 80 fluid will be forced through the outlet passage 130 under pressure past the valve member 138 and through the conduit 150 to the reservoir unit 24. The high pressure fluid flowing in the reservoir unit is then directed through the inlet port 192 and passage 194 into the high pressure hydraulic accumulator chamber 176. Of course, if this chamber is already under a predetermined maximum pressure, check valve 206 will open permitting the pressurized fluid to flow into the low pressure hydraulic sump chamber 184 through passage 198 and bore 200.

On the rebound stroke of the piston unit, low pressure fluid is replenished into the cylinder 78 from the low pressure hydraulic sump chamber 184 through the outlet port 212, conduit 214, by valve 224, and through inlet passage 230. In this way, the pump damper assembly 28 serves to convert part of the energy of relative movement between the sprung and unsprung masses of the vehicle into hydraulic pressure energy and this hydraulic pressure energy is accumulated or stored in the high pressure hydraulic chamber 176 of the reservoir unit 24.

The present invention contemplates the utilization of this hydraulic pressure energy to maintain the hydro-pneumatic strut assembly 26 in a predetermined vertical relationship so that the strut will support the sprung mass of the vehicle in a predetermined vertical relation with respect to the unsprung mass regardless of the static load carried thereby. To this end, the unit 22 includes a leveling valve mechanism generally indicated at 232. In general, the leveling valve mechanism is constructed in accordance with teachings of my co-pending application Serial No. 814,065 and is arranged to communicate the high pressure hydraulic accumulator chamber 176 with the hydraulic chamber 74 of the hydro-pneumatic strut as the sprung mass moves downwardly with respect to the unsprung mass below its predetermined vertical position thus permitting hydraulic fluid to flow into the hydraulic chamber 74 until such time as the sprung mass is raised into its predetermined position. When the sprung mass moves above its predetermined vertical position with respect to the unsprung mass, the leveling valve mechanism is operable to exhaust hydraulic fluid from the hydraulic chamber 74 of the hydro-pnuematic strut into the low pressure hydraulic sump chamber 184.

Figure 10:
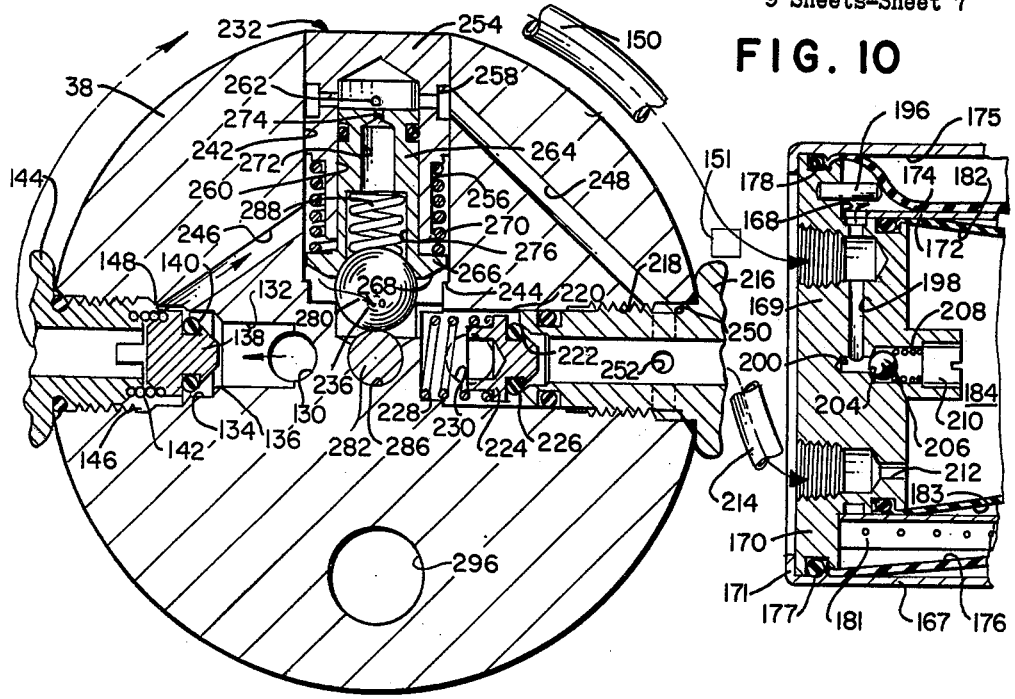
FIGURE 10 is a sectional view taken along a surface of revolution passing through the axes of the valve mechanism and the inlet and outlet valves showing the position of the inlet and outlet valves and the leveling valve mechanism during compression and schematically illustrating the direction of flow to the reservoir unit, the latter being shown in fragmentary vertical section.
Figure 11:
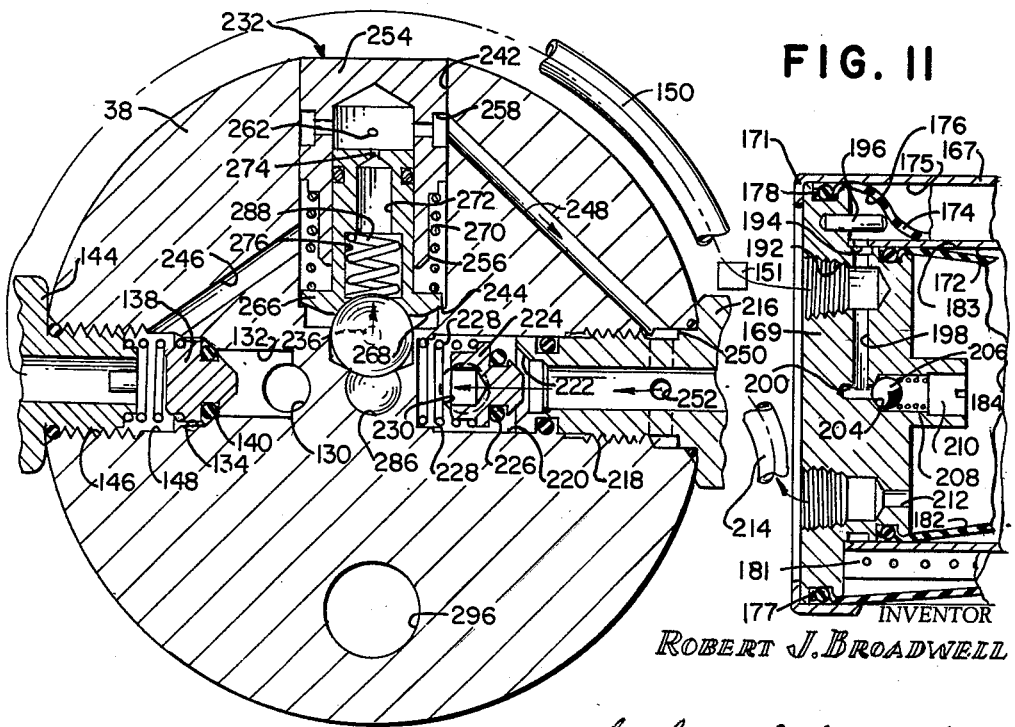
FIGURE 11 is a view similar to FIGURE 10 showing the position of the parts during rebound.

To this end, a bleed orifice 234 is formed in the cylinder 78 to communicate the hydraulic chamber 74 of the hydro-pneumatic strut assembly with the upper end of the pump damper cylinder. The end member 38 forms a valve body for the leveling valve mechanism and has formed therein a working port 236 extending longitudinally therein in communication with the pump damper cylinder 78 (see FIGURE 8). The inner end of the port 236 communicates with a bore 238 formed in the end member 38 in a position between the outlet and inlet passages 130 and 230 as shown in FIGURES 10 and 11. The bore 238 has first and second counterbores 240 and 242 formed therein which define therebetween an annular valve seat 244. Communicating with the second counterbore in longitudinally-spaced relation are an inlet or high pressure port or passage 246, which extends diagonally from the intermediate counterbore 148 associated with the high pressure conduit 150 to the inner portion of the second counterbore 242, and an outlet or low pressure port or passage 248, which extends diagonally between the outer counterbore 218 associated with the low pressure conduit 214 and the outer end portion of the second counterbore 242. In regard to the latter, it will be noted that the exterior of the nipple 216 is provided with an annular groove 250 adjacent passage 248, such groove being communicated with the interior of the nipple by means of a pair of diametrically opposed radially extending openings 252.

Fixedly mounted within the second counterbore 242 is a valve insert 254 having a pair of longitudinally-spaced annular recesses 256 and 258 formed in the exterior surface thereof, the portion of the valve insert 254 between the recesses being disposed between the ports 246 and 248 to separate the same. Formed within the valve insert is a central bore 260 which is communicated with the recess 258 by means of a plurality of circumferentially-spaced radial openings 262.

A valve member 264 is slidably mounted within the central bore 260 of the insert. The valve member includes an annular flange 266 extending radially outwardly from one end thereof beyond the adjacent end of the valve insert. The end of the valve member is provided with a frusto-conical surface 268 for engaging the valve seat 244, such surface being resiliently urged into engagement with the valve seat by means of a coil spring 270 positioned between the annular flange 266 and valve insert 254. The engagement of the frusto-conical surface 268 of the valve member 264 with the valve seat 244 controls the flow of hydraulic fluid from the high pressure port 246 to the working port 236.

The valve member is also provided with a central bore 272, the inner end of which is communicated with the central bore 260 of the valve insert by means of a restricted orifice 274. Formed in the opposite end of the central bore 272 of the valve member is a counterbore 276, the outer end of which is formed with a frusto-conical valve seat 278. A ball valve 280 for engaging the seat 278 is disposed within the inner end portion of the bore 238 for longitudinally reciprocating movement.

The ball valve controls the flow of hydraulic fluid from the working port 236 to the low pressure port 248. It will be noted that the flow from the high pressure port to the working port and the flow from the working port to the low pressure port is interrupted when the ball valve 280 is disposed in the position illustrated in FIGURE 8. This position constitutes a null position of the valve mechanism and the ball valve is maintained in this position by means of a cam rod 282 having one end thereof provided with a semi-spherical cam surface 284 arranged to reciprocate within a longitudinal bore 286 formed in the central portion of the end member 38 to engage the adjacent surface of the ball valve. A coil spring 288 is disposed within the counterbore 276 of the valve member 264 in engagement with the ball valve to resiliently urge the latter into engagement with the cam rod.

As best shown in FIGURE 2A, the opposite end of the cam rod 282 extends through the sleeve 84 of the piston 80 and a sleeve 290 fixedly mounted within the adjacent end of the hollow piston rod 116. Fixed to the adjacent portion of the cam rod is a ferrule 292, one surface of which is arranged to engage the sleeve 290 to limit the upward movement of the cam rod when the pump damper assembly 28 is disposed in its normal predetermined position. The cam rod is maintained in its limiting position by means of a coil spring 294 mounted within the hollow piston rod between the opposite surface of the ferrule 292 and the end member 76 of the tubular plunger member. Preferably, the cam rod is reduced at its lower end portion so as to extend within the coil spring 294 as shown in FIGURE 2.

It will be understood that any suitable means may be provided for introducing hydraulic fluid and air into the various chambers of the system. For example, the end member 38 of the combined hydro-pneumatic strut and pump damper unit may be provided with a longitudinally extending opening 296 through which oil may be introduced into the hydraulic chamber of the strut and also into the cylinder of the pump damper. The opening 296 may be closed by a suitable plug 298. The air chamber 34 of the combined unit 22 may be filled with air under pressure through a fitting 300 arranged to be closed by a cap 302. Air under pressure is introduced into the outer gas chamber 175 of the reservoir unit 24 by a similar fitting 304 arranged to be closed by a cap 306.

Referring now more particularly to FIGURE 1, it will be seen that four combined units 22 are provided adjacent the wheels of the vehicle. As shown, the two units 22 associated with the front wheels are connected in parallel with a reservoir unit 24 and the rear units 22 are connected in parallel to a second reservoir unit 24. It will be understood that while the arrangement as shown is preferred, each of the units 22 may be provided with a reservoir unit or a single reservoir unit may be provided for all four of the units 22.

In general, the units 22 are connected between the sprung and unsprung masses of the vehicle in a conventional manner. As shown, an eye-connector 308 is rigidly secured to the upper end of the end member 38 and a stem connector 310 is rigidly secured to the end member 76. With this arrangement the stem connector 310 is resiliently mounted on a bracket or the like fixed to the associated wheel mounting structure and the eye-connector 308 is resiliently pivoted to the frame at an appropriate position. Of course, other types of connectors may be employed and both ends of the unit may be provided with either stem type connectors such as the connector 310, or eye-type connectors such as the connector 308. The reservoir units are perferably secured to the frame or sprung mass of the vehicle and any suitable means may be employed for this purpose, such as brackets 312.

As indicated above, the action of the pump damper assembly 28 during travel of the vehicle is such as to supply hydraulic fluid under pressure to the high pressure accumulator chamber 176 of the reservoir unit 24. Thus, considering the operation of the present system with the vehicle in a parked or at rest position with the motor off, the high pressure hydraulic chamber of the reservoir unit will be substantially filled with hydraulic fluid and under maximum pressure. Examples of the pressure available in the reservoir as shown in FIGURE 6 are as follows. The high pressure gas chamber 175 is under an initial pressure of approximately 100 p.s.i. The hydraulic fluid within the high pressure hydraulic chamber 176 is maintained between 100 and 350 p.s.i. At 350 p.s.i. the reservoir contains approximately 30 cubic inches of hydraulic fluid. The low pressure gas chamber is initially at atmospheric pressure.

It is contemplated that in a normal installation approximately 6 cubic inches are needed to level a five-passenger load for each hydro-pneumatic strut unit. Thus, one reservoir unit 24 could be employed to effect the leveling action of four hydro-pneumatic struts. However, it is preferable to employ a reservoir unit for each pair of struts as shown and described above. Under these conditions, it can be seen that there is ample energy available in the reservoir unit to effect a leveling of the vehicle frame when the same is statically loaded, as by five passengers boarding the same, without the necessity of the automobile being in motion or even the engine running. Moreover, the present reservoir unit could effect a leveling action even when the vehicle is filled and emptied two or three times before the engine is started and the vehicle is put into motion.

Under static conditions it will be noted that when a load is imposed upon the vehicle such as when passengers board the same or a payload is added in the case of truck vehicles, the hydro-pneumatic strut will be inwardly telescoped along with the pump damper assembly. That is, the tubular plunger member will move upwardly with respect to the casing members 30 and 52 and the piston rod and piston of the pump damper assembly will move inwardly with respect to the cylinder 78.

During this movement, the cam rod 282 will move upwardly with the piston 80 through the action of spring 294, which, of course, is of a strength sufficient to overcome the strength of spring 270 of the valve mechanism. The upward movement of the cam rod 282 will effect movement of the ball valve 280 away from the opening 286 which, in turn, moves the valve surface 268 away from the valve seat 244 as shown in FIGURE 10.

With the valve member 264 in the position shown in FIGURE 10, high pressure hydraulic fluid from port 246 is free to pass into the bore 242, past valve seat 244 and then through the working port 236 and into the pump damper cylinder 78. From the pump damper cylinder fluid passes through the bleed orifice 234 into the hydraulic chamber of the strut assembly.

Figure 8:
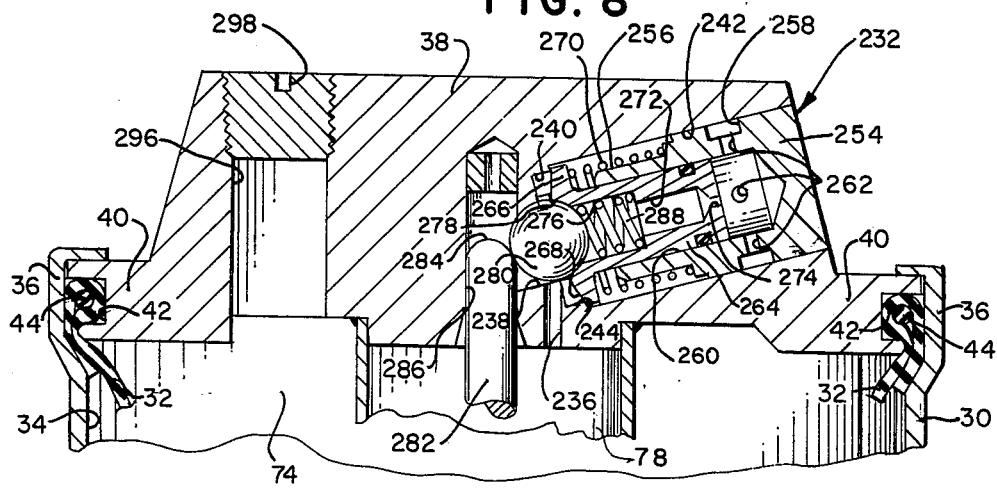
FIGURE 8 is an enlarged, fragmentary longitudinal sectional view of the upper end portion of the combined self-leveling hydro-pneumatic strut and pump damper unit taken through the axis of the valve mechanism and showing the position of the valve mechanism when the vehicle frame is positioned at its proper height.
Figure 9:
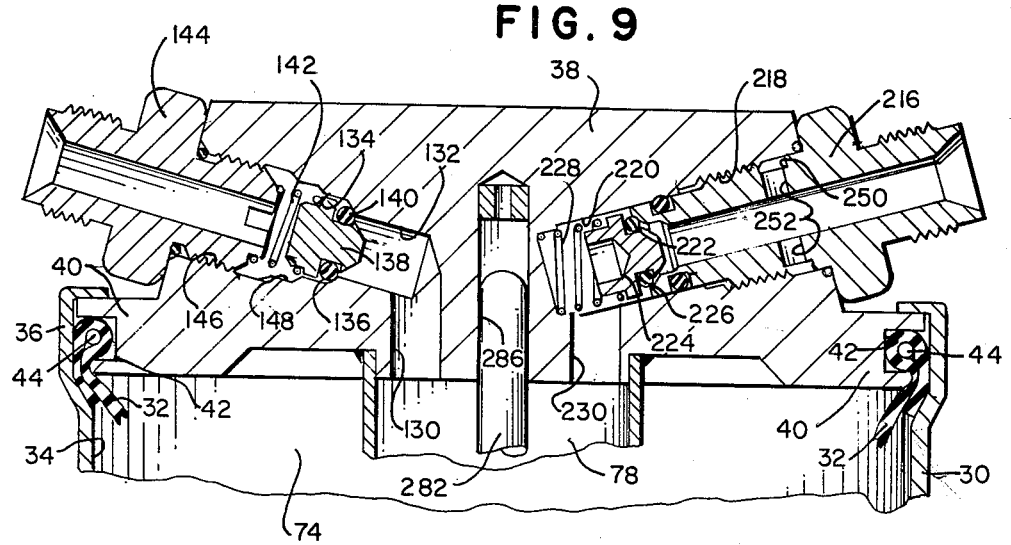
FIGURE 9 is a fragmentary longitudinal view of the structure shown in FIGURE 8 taken at a 90° angle with respect thereto, showing the position of the inlet and outlet valves when the vehicle frame is positioned at its proper height.

It will also be noted that in order for the piston unit 80 to move upwardly within the cylinder 78, hydraulic fluid must also be forced out of the outlet port 130 past the valve 138. At the same time the air chamber 34 of the strut will compress. Of course, where static loads are involved, the flow of fluid outwardly of the cylinder 78 through the outlet port 130 will cease before enough fluid has been introduced into the cylinder through the working port 236 of the valve mechanism to expand the unit 22 back into its normal predetermined position. Thus, hydraulic fluid under pressure from the high pressure hydraulic chamber 176 of the reservoir unit will continue to pass into the cylinder 78 through port 246 and through the leveling valve mechanism until the expansion of the unit moves the frame back into its predetermined position. At that time the cam rod 282 will move back into its normal predetermined position thus permitting the valve mechanism to assume its null position as shown in FIGURE 8.

When the static load on the vehicle is removed, as by passengers alighting from the vehicle, the air in the air chamber 34 will expand causing the telescoping parts of the unit to likewise expand. As before, the expansion will effect movement of hydraulic fluid from the low pressure hydraulic chamber 184 of the reservoir unit into the cylinder 78 past valve 224 and inlet port 230. At the same time the cam rod 282 is moved downwardly by the engagement of sleeve 290 with ferrule 292, permitting the ball valve to move toward the opening 286 against the action of spring 288 into the position shown in FIGURE 11.

With the valve mechanism in the position shown in FIGURE 11, hydraulic fluid within the cylinder 78 is free to pass to the low pressure chamber 184 of the reservoir unit past the ball valve 280, through the central bore 272, orifice 274, openings 262, groove 258, low pressure passage 248, groove 250 and openings 252. Again, the intake of hydraulic fluid through the inlet port 230 will be interrupted prior to the exhausting of the hydraulic fluid through the leveling valve mechanism. This latter action will continue until the cam rod 282 moves back into its predetermined position and the ball valve 280 is moved into engagement with the valve seat 278.

Under the dynamic conditions encountered during travel of the vehicle, the above actions take place in a rapid manner. The size of the ports 246 and 248 and the size of the bleed orifice 234 determine to a large extent the ride characteristics of the present system. As the ports and orifice are decreased in size to increase restriction to flow, the amount of pumping action of the pump damper assembly increases. Thus, for a given energy input the amount of pump output will vary according to the size of the ports 246 and 248 and the size of the orifice 234. The maximum size of the openings is limited in that they must be small enough to permit more oil to be moved by the piston than can be handled through the leveling valve mechanism and the bleed orifice 234.

The pump damper assembly, in addition to its pumping action, also provides a damping action, the requirement for which is inversely proportional to its pumping action. That is, the more pumping action achieved by the pump damper the less dampening action it must have It is preferable to make the ports 246 and 248 and the orifice 234 relatively small to achieve a greater pumping action, since the damping action of the pump damper need not have as great an effect on the ride due to the cushioning effect of the air chamber 34 as if the vehicle frame were suspended with conventional metal springs.

The back pressure control valve 151 is important in relation to the damping action of the pump damper assembly since it acts to maintain a substantially constant downstream blow off pressure on the valve member 138, thereby insuring that the damping characteristics of the pump damper assembly will not vary in accordance with the accumulator pressure. With the use of a spring load check valve such as the valve member 138, the pressure on the down-stream side of the valve member would affect the pressure in the pump damper chamber required to unseat the valve. If the down-stream pressure on the valve member 138 is allowed to vary in relation to the variance of the accumulator pressure then the damping characteristics of the pump damper assembly would vary in accordance with the accumulator pressure. The back pressure control valve 151 is operable to maintain a substantially constant pressure on the down-stream side of valve member 138 through the action of the piston member 155 and the opposing coil springs 160 and 166.

The up-stream pressure required to blow off the valve member 159 of the back pressure control valve 151 is equal to the differential pressure on the down-stream side of the valve member 159 plus the force of spring 160. As this down-stream pressure, which is equal to the accumulator pressure, increases, the force of the spring 160 decreases proportionally. This relationship is accomplished due to the movement of the piston member 155 against the action of spring 166 as the down-stream or accumulator pressure increases. As the piston member 155 moves against the spring 166 the force imposed by the spring 160 is reduced. Conversely, the force of spring 160 will increase in response to a decrease in accumulator pressure. In this way, the up-stream pressure acting on the valve 159 is maintained at a substantially constant value. That is, at the point during the normal cycle of operation when valve member 138 must blow off, the back pressure thereon will be at a value which is substantially the same irrespective of the accumulator pressure. The valve member 138 momentarily is set to blow off at maximum accumulator pressure, as for example 350 p.s.i., and because the back pressure on this valve is constant, at least at the time just prior to blow off, the valve member 138 will always blow off at 350 p.s.i. regardless of the pressure in the high pressure hydraulic chamber 176. Variance in pressure of the low pressure hydraulic chamber 184 has a negligible effect on the damping characteristics of the pump damper assembly.

Referring now more particularly to FIGURE 12, there is shown therein an arrangement wherein a pair of combined units 22 and a single reservoir unit 24 may be utilized as auxiliary equipment on a conventionally suspended vehicle. With this arrangement, a pair of units 22 are mounted in the manner indicated above between the unsprung mass 314, such as the rear axle housing of a conventional vehicle, and the sprung mass 316, such as the frame, the latter being supported on the former by conventional coil springs 317. With this arrangement, the combined units 22 serve to support a portion of the load of the sprung mass which would cause the coil springs 317 to yield. The action of the leveling valve mechanism within the units 22 serves to maintain the rear of the frame in a predetermined vertical position regardless of the load imposed thereon. Thus, with the arrangement shown in FIGURE 12, the rear end of a vehicle can be maintained in a proper vertical relation regardless of the load imposed on the frame, thereby eliminating the annoying problem of the rear overhang of the vehicle scraping the street during movement over a steep driveway or the like, and insuring that a heavy load in the rear of the vehicle will not cause the beams of the headlights to change position.

The present invention also contemplates the utilization of a modified combined hydro-pneumatic strut and pump damper unit 318 as an assist unit for a conventionally suspended vehicle without the utilization of the reservoir unit and the leveling valve mechanism. Under these conditions the combined hydro-pneumatic strut and pump damper unit will serve to support added loads on the rear end of the vehicle frame 316, however there will be no automatic leveling of the vehicle regardless of the load imposed thereon. With the use of the combined units alone, as illustrated in FIGURE 13, the rear of the frame 316 will be maintained in a higher position for any given load than would be the case where the conventional suspension system or leaf springs 317 alone is relied upon. Thus, the utilization of the units by themselves would alleviate to a considerable extent the problem of excessive loads causing the rear of the frame to ride too low.

Figure 14A:
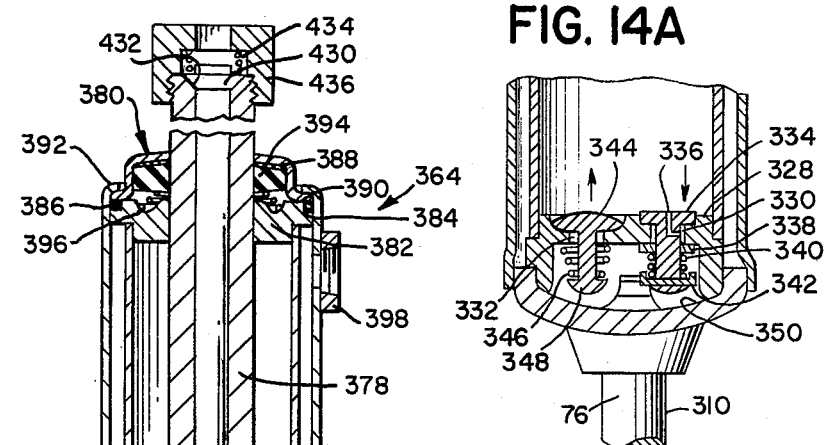
FIGURE 14A is an enlarged fragmentary view of part of the structure illustrated in FIGURE 14.
Figure 16:
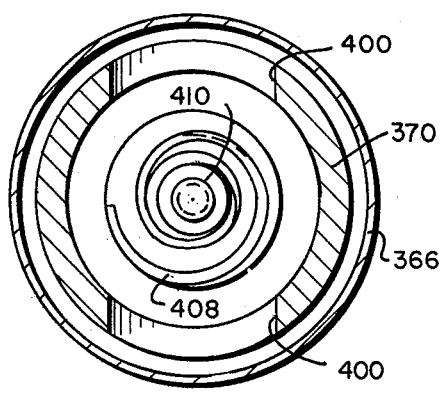
FIGURE 16 is an enlarged fragmentary cross-sectional view taken along the line 16—16 of FIGURE 15.

Referring now more particularly to FIGURE 14, there is shown a combined hydro-pneumatic strut and pump damper unit 318 modified for use in the arrangement illustrated in FIGURE 13. The unit shown in FIGURE 14 in general is quite similar to the arrangement previously described and corresponding parts have been designated by the same reference numerals. Of course, the main difference resides in the fact that the leveling valve mechanism is eliminated together with the cam actuator rod. Thus, the end member 38 is replaced by an end member 320 having the upper end of a solid piston rod 322 fixed to the central portion thereof. On the lower end of the piston rod there is mounted a piston 324 which is substantially identical to the piston 80 previously described. The only difference resides in the fact that the sleeve 84 previously described is replaced by a stem member 326.

The unit shown in FIGURE 14 also differs from the unit previously described in that the lower end of the cylinder 78' is closed by means of an end plate 328 having an outlet opening 330 and an inlet opening 332 formed therein. Mounted within the outlet opening 330 is a valve stem 334 having a bleed orifice 336 formed therein. A valve member 338 is mounted in surrounding relation to the stem 334 and is resiliently urged into closing engagement with the lower surface of the opening 330 by a coil spring 340 having one end engaging the valve member and its opposite end engaging a flange 342 on the lower end of the valve stem 334. Mounted within the inlet opening 332 is a replenishing valve 344 which is resiliently urged into closing engagement with the opening by a coil spring 346 having one end in engagement with the end plate 328 and its opposite end engaged with a flange 348 on the lower end of the valve member 344. The lower side of the end plate 328 is communicated with the fluid in the main hydraulic chamber of the strut through an opening 350 adjacent the end member 76 and the outer periphery of the cylinder 78'.

The opposite end of the cylinder is closed by means of an end plate 352. The upper end of the end plate 352 is connected with the adjacent extremity of the tubular plunger member, the extremity of the latter being preferably turned down over the upper surface of the end member. The latter is provided with a plurality of circumferentially spaced openings 354 which communicate the upper surface of the end member with the space between the outer periphery of the cylinder 78' and the inner periphery of the plunger member. Preferably, the periphery of the end member is relieved, as indicated at 356, at a position above the extremity of the cylinder 78' and within the openings 354.

It will also be noted that in the construction illustrated in FIGURE 14 the exterior surface of the plunger member 54 and the interior surface of the inner casing member 52 are both cylindrical in configuration as indicated at 358 and 360. Of course, this arrangement could be readily embodied in the units previously described and the frusto-conical surfaces of the arrangement previously described could be employed in the present structure. With the frusto-conical surface previously described the effective area decreases as the displacement increases, resulting in a flattening out of the load versus displacement curve. Thus, with the straight cylindrical surfaces as shown in FIGURE 14, the displacement will steadily increase as the load increases, whereas with the frusto-conical surfaces previously described the displacement will increase a greater amount per unit load due to the reduction in the effective area of the seal. This latter arrangement is preferred where greater displacements are encountered and has the effect of reducing the pressure involved for a given load.

It will also be noted from FIGURE 14 that the fitting 300 for introducing air into the air chamber 34 is provided with a conventional air valve 362. With the use of the valve it is possible to readily vary the air pressure within the chamber 34 and by so doing position the frame at a constant predetermined level for any given load. Thus, with the arrangement shown in FIGURES 13 and 14, if the vehicle is to be transported on a long trip with a heavy load such as baggage and rear seat passengers, the operator could attach a conventional air hose such as found in any filling station to the valve 362 and by the introduction of sufficient air pressure into the air chamber 34 effectively elevate the loaded frame to a desired riding height. Of course, when the trip is completed and the heavy load is removed, it would be nececessary to exhaust some of the air from the valve 362 in order to prevent the units from causing the frame to ride too high.

As was indicated above, the system of the present invention embodying the reservoir unit 24 provides a source of hydraulic fluid under pressure which can be utilized not only to automatically level the vehicle through the valve mechanism previously described but, this hydraulic fluid under pressure could readily be utilized to operate any of the well-known power equipment presently employed on vehicles, such as power steering, power brakes, power-operated seats and windows, power actuators for convertible tops, truck power equipment and the like. With the pump damper described above the amount of pumping action is limited since it is obtained only during the compression stroke of the piston. The movement of the fluid within the cylinder 78 on opposite sides of the piston during rebound provides only a damping action. With the arrangement previously described the piston valving provides approximately 90% of the damping action while the valving relating to the pumping aspects of the unit provide approximately 10% of the damping action. It is contemplated that a double acting pump damper assembly could be embodied in the present system, that is, an assembly in which a pumping action is obtained not only during the compression stroke but during the rebound stroke as well. Under these circumstances the pump valving would provide approximately 95% of the damping action while 5% would be provided by the piston valving.

Figure 15:
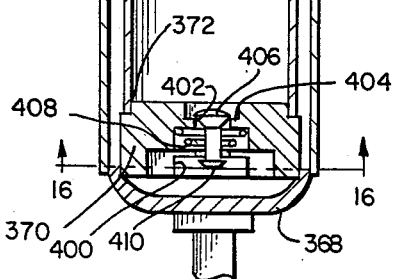
FIGURE 15 is a vertical sectional view of a modified form of a pump damper unit embodying the principles of the present invention.

In FIGURE 15 there is shown a double acting pump damper assembly or unit, generally indicated at 364. The unit 364 is shown by itself since it is contemplated that where the reservoir unit is employed for the purpose of activating power equipment on the vehicle other than a hydropneumatic strut, it is preferable to utilize a double acting pump damper unit since it is capable of converting more of the energy of relative movement between the sprung and unsprung masses of the vehicle during travel into high pressure energy than a single acting pump damper of the type described above. It will be understood, however, that the unit 364 may be readily embodied as part of a combined self-leveling hydro-pneumatic strut and pump damper unit such as the unit 22 described above.

The unit 364 comprises an outer tubular casing 366 preferably of cylindrical configuration having an end member or plate 368 closing the lower end thereof. The end plate 368 may be secured to the outer casing member 366 by any suitable means, such as welding or the like. Fixed within the end plate 368 is a cylindrical base member 370 having its upper end provided with an annular groove 372 to fixedly receive the lower end of a cylinder 374 fixed in concentric relation within the outer casing member 366. Slidably mounted within the cylinder 374 is a piston 376 having a hollow piston rod 378 fixed thereto and extending upwardly through the upper end of the cylinder 374. A suitable closure assembly 380 is provided between the upper ends of the outer casing member 366 and cylinder 374 in surrounding relation to the piston rod 378. As shown, the assembly 380 includes a lower closure member 382 arranged to fit within and to be fixedly secured to the interior of the upper extremity of the cylinder 374. The member 382 includes an outwardly extending annular flange 384 arranged to engage the inner periphery of the outer casing member 366. Preferably, the flange 384 is grooved to receive an O-ring seal 386.

The assembly 380 also includes an upper closure member or plate 388 having a lower annular flange 390 arranged to engage the O-ring seal 386. The upper closure member 388 is preferably secured in position by turning down the upper edge of the outer casing member 366 over the annular flange 390, as indicated at 392. Mounted within the upper closure member 388 is a sealing disk or ring 394 which is resiliently urged upwardly by means of a spiral coil spring 396 mounted in surrounding relation to the piston rod 378 between the sealing disk 394 and the lower closure member 382.

Low pressure hydraulic fluid, as from the low pressure hydraulic sump chamber 184 of the reservoir unit 24, is supplied to the unit 364 through a fitting 398 secured to the outer periphery of the casing member 366 adjacent the upper end thereof. The low pressure hydraulic fluid passes through the fitting 398 and to the space between the outer periphery of the cylinder 374 and the inner periphery of the casing member 366. Formed in the base member 370 is a pair of diametrically opposed inlet openings 400 which permits the fluid within the space between the cylinder and outer casing member to enter between the end plate 368 and the base member 370. The latter has formed therein a central opening 402 providing a valve seat 404 which is arranged to be engaged by an inlet valve member 406. The valve member 406 is resiliently urged into engagement with the valve seat 404 by a spiral coil spring 408 having one end engaging the base member 370 and its opposite end engaging a flange 410 on the lower end of the valve member 406.

The piston 376 has an opening 412 formed in the upper end thereof which is preferably threaded to receive the lower end of the piston rod 378. Formed in the central portion of the piston below the opening 412 is an enlarged cavity 414, the lower end of which defines an annular valve seat 416 surrounding a lower opening 418. Mounted within the central cavity 414 is a disk valve member 420 having a bleed orifice 422 formed in the central portion thereof. The valve disk 420 is resiliently urged into engagement with the valve seat 416 by means of a helical coil spring 424 connected between the disk valve and a reduced lower extremity of the piston rod 378. The latter is preferably provided with a plurality of circumferentially spaced openings 426 within the cavity 414. Formed within the piston rod at a position just above the piston 376 is a pair of diametrically opposed openings 428 which communicate the exterior of the piston rod with the hollow interior thereof.

It will be understood that where the unit 364 is utilized only in conjunction with a reservoir unit 24, the unit 364 is connected between the sprung and unsprung masses of the vehicle in the same manner as the units 318 previously described. As indicated above, the fitting 398 is connected with the low pressure hydraulic sump chamber 184 through the opening 212 thereof by suitable conduit, such as the conduit 214 previously described. The outwardly extending end of the piston rod 378 is connected with the high pressure hydraulic chamber 176 of the reservoir unit through suitable conduit such as conduit 150 connected between the outwardly extending end of the piston rod and the inlet opening or port 192. Preferably, one way valve means is disposed between the interior of the piston rod 378 and the port 192 and, as shown, the end of the piston rod has mounted therein a check valve 430 which is resiliently urged into engagement with a frusto-conical valve seat 432 formed in the end of the piston rod by a coil spring 434 having one end engaging the valve 430 and the opposite end engaging a fitting 436 on the end of the piston rod.

As mentioned above, the pump damper unit 364 may be readily employed in the combined unit 22 previously described to replace the single acting pump damper assembly 28 illustrated therein.

In the operation of the double acting pump damper unit 364, it will be understood that on compression the hydraulic fluid trapped in the lower portion of the cylinder 374 below the piston 376 will cause the valve 420 to move off of the seat 416 permitting the fluid to flow into the cavity 414, through openings 426 and then outwardly through the hollow interior of the piston rod 378. It will be understood that a portion of the fluid flowing through the hollow piston 378 will pass into the end of the cylinder above the piston 376 through openings 428 to maintain the same in a filled condition. The remaining fluid will pass by the check valve 430 and into the high pressure hydraulic conduit 150 and finally into the high pressure hydraulic accumulator chamber 186. The amount of hydraulic fluid displaced or moved into the chamber 186 during the compression stroke will be equal to the cross-sectional area of the piston rod 378 times the displacement of the piston.

On rebound, low pressure hydraulic fluid will be supplied into the lower end of the cylinder 374 past the replenishing valve 406. The hydraulic fluid trapped in the upper end of the cylinder will be moved outwardly through the hollow piston rod 378, through openings 428, the valve 420 substantially preventing a flow of fluid into the lower end of the chamber. The bleed orifice 422 is provided to improve the ride characteristics. Therefore, during the rebound stroke the amount of fluid pumped will be substantially equal to the cross-sectional area of the cylinder less the cross-sectional area of the piston rod times the displacement.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a vehicle, the combination comprising a sprung mass including a frame and an unsprung mass including a ground engaging wheel, a high pressure reservoir on the vehicle, said reservoir comprising a pressure container, a rigid tubular member within said container dividing the same into an outer high pressure compartment and an inner low pressure compartment, an outer sleeve of flexible material between said container and said tubular member dividing the high pressure compartment into a high pressure gas chamber and a high pressure hydraulic chamber, and an inner sleeve of flexible material dividing said low pressure compartment into a low pressure gas chamber and a low pressure hydraulic chamber, pump means connected between said sprung and unsprung masses and communicating with said high and low pressure hydraulic chambers for effecting movement of hydraulic fluid from said low pressure hydraulic chamber to said high pressure hydraulic chamber in response to the relative movements between said sprung and unsprung masses.

2. In a vehicle, the combination comprising a sprung mass including a frame and an unsprung mass including a ground engaging wheel, means on the vehicle defining a high pressure hydraulic chamber, means on the vehicle defining a low pressure hydraulic chamber, pump means connected between said sprung and unsprung masses and communicating with said high and low pressure hydraulic chambers for effecting movement of hydraulic fluid from said low pressure hydraulic chamber to said high pressure hydraulic chamber in response to the relative movements between said sprung and unsprung masses, valve means between said pump and said high pressure hydraulic chamber for controlling the flow of hydraulic fluid from said pump means to said high pressure hydraulic chamber and for preventing flow therethrough from said high pressure hydraulic chamber to said pump means, said valve means being operable to permit flow therethrough from said pump means to said high pressure hydraulic chamber only when the hydraulic pressure in said pump means acting on said valve means is greater than a predetermined value which is constant irrespective of the pressure in said high pressure hydraulic chamber.

3. The combination as defined in claim 2 wherein said valve means comprises a spring pressed check valve operable to open in response to the development of said predetermined pressure in said pump means, and back pressure control valve means between said check valve and said high pressure hydraulic chamber for maintaining a substantially constant back pressure on said check valve.

4. The combination as defined in claim 3 wherein said back pressure control valve means comprises a movable member having first spring means resiliently urging the same in one direction, said member having a valve seat thereon facing in said one direction, a valve member engageable with said valve seat, second spring means acting in a direction opposed to said one direction resiliently urging said valve member into engagement with said valve seat, the said member being movable in said opposite direction against the action of said first spring means to decrease the loading of said second spring means in response to an increase in the pressure within said high pressure hydraulic chamber.

5. In a vehicle having sprung and unsprung masses, the combination comprising a hydraulic pump damper adapted to be connected between the sprung and unsprung masses of the vehicle, said pump damper having a cylinder, a piston slidable in said cylinder, and a piston rod fixed to said piston and extending from one side thereof outwardly of said cylinder, passage means formed in said piston interconnecting the ends of said cylinder on opposite sides of said piston, said passage means including a valve seat having a valve connected therewith operable to open in response to increase in pressure in said cylinder on the side of said piston opposite from said piston rod, a high pressure reservoir, pressure responsive means dividing said high pressure reservoir into a high pressure hydraulic chamber and a high pressure gas chamber, means defining a low pressure hydraulic chamber, means communicating said cylinder with said high pressure hydraulic chamber including valve means preventing flow of hydraulic fluid directly from said high pressure hydraulic chamber to said cylinder, and means communicating said low pressure hydraulic chamber with said cylinder including valve means preventing flow of hydraulic fluid directly from said cylinder to said low pressure hydraulic chamber, both of said valve means being disposed in the end of said cylinder opposite from the piston rod end thereof.

6. In a vehicle having sprung and unsprung masses, the combination comprising a load supporting strut adapted to be connected between the sprung and unsprung masses of the vehicle, said strut including a pair of telescoping strut parts, a flexible member within one of said strut parts dividing the interior space of said strut parts into an air chamber and a hydraulic chamber, and a pair of telescoping pump parts mounted within the hydraulic chamber of said strut parts for telescopic movement with the latter, said pump parts including a hydraulic pump cylinder and a member movable in said cylinder to force hydraulic fluid into and out of said cylinder in response to the simultaneous telescopic movement of said strut and pump parts, a high pressure reservoir container, pressure responsive means dividing said high pressure container into a high pressure gas chamber and a high pressure hydraulic chamber, means defining a low pressure hydraulic reservoir chamber, means communicating said pump cylinder with said high pressure hydraulic chamber including valve means preventing flow of hydraulic fluid directly from said high pressure hydraulic chamber to said pump cylinder, means communicating said low pressure hydraulic chamber with said pump cylinder including valve means preventing flow of hydraulic fluid directly from said pump cylinder to said low pressure hydraulic chamber, and means communicating the hydraulic strut chamber with said high and low hydraulic pressure chambers including a valve mechanism operable to interrupt the communication of said hydraulic strut chamber with both the high and low pressure hydraulic chambers, when the sprung and unsprung masses of the vehicle are disposed in a predetermined vertical position with respect to each other, said valve mechanism being operable in response to the movement of the sprung and unsprung masses of the vehicle out of said predetermined position in one direction to communicate said high pressure hydraulic chamber with said hydraulic strut chamber and in the opposite direction to communicate said low pressure hydraulic chamber with said hydraulic strut chamber.

7. The combination as defined in claim 6 wherein means is provided for communicating said high pressure hydraulic chamber with said low pressure hydraulic chamber including valve means operable to permit such communication only in response to the pressure within said high pressure chamber reaching a predetermined value.

8. The combination as defined in claim 6 wherein said valve means preventing flow of hydraulic fluid directly from said high pressure hydraulic chamber to said pump cylinder includes a spring pressed check valve operable to open in response to the development of a pressure of a predetermined value in said pump means and back pressure control valve means between said check valve and said high pressure hydraulic chamber for maintaining a substantially constant back pressure on said check valve irrespective of the pressure in said high pressure hydraulic chamber.

9. The combination as defined in claim 8 wherein said back pressure control valve means comprises a movable member having first spring means resiliently urging the same in one direction, said member having a valve seat thereon facing in said one direction, a valve member engageable with said valve seat, second spring means acting in a direction opposed to said one direction resiliently urging said valve member into engagement with said valve seat, the said member being movable in said opposite direction against the action of said first spring means to decrease the loading of said second spring means in response to an increase in the pressure within said high pressure hydraulic chamber.

10. The combination as defined in claim 6 wherein said member movable in said pump cylinder comprises a piston having a piston rod rod extending from one side thereof outwardly of said pump cylinder, said piston having first passage means permitting flow of hydraulic fluid within said cylinder from one side of said piston to the opposite side thereof, and second passage means permitting flow of hydraulic fluid within said cylinder from the opposite side of said piston to said one side thereof, and pressure responsive valve means in each of said passage means.

11. The combination as defined in claim 10 wherein one of said strut telescoping parts includes a tubular casing having an end member closing one end thereof, said end member being rigidly secured to one end of said pump cylinder and having both of said valve means and said valve mechanism mounted therein.

12. The combination as defined in claim 11 wherein said valve mechanism includes a valve member movable to effect the operation of said valve mechanism and an elongated rod having one end in engagement with said valve member to effect movement thereof, the opposite end of said elongated rod being mounted in said piston for movement with the latter during the relative movement of said piston away from said end member and for relative telescoping movement within said piston rod during the relative movement of said piston toward said end member.

13. The combination as defined in claim 11 wherein said means communicating the hydraulic strut chamber with said high and low hydraulic pressure chambers comprises a bleed orifice in said pump cylinder communicating said hydraulic strut chamber with the interior of the pump cylinder adjacent said end member, a first passage in said end member between said valve mechanism and said means communicating said pump cylinder with said high pressure hydraulic chamber on the downstream side of the associated valve means and a second passage in said end member between said valve mechanism and said means communicating said low pressure hydraulic chamber with said pump cylinder on the upstream side of the associated valve means.

14. A self damping load supporting strut adapted to be connected between the sprung and unsprung masses of a vehicle comprising a plunger part, a closed hollow body part having an opening telescopically receiving said plunger part, a folded rolling sleeve seal between said plunger and said hollow body parts closing the plunger part receiving opening of the latter, a sleeve of flexible material within said hollow body dividing the same into an annular gas chamber and a hydraulic chamber communicating with said seal, means fixed with respect to one of said strut parts defining a cylindrical pump damper chamber within said parts, a pump damper piston slidable in said pump damper chamber, a piston rod fixed to said piston and extending from one side thereof through said pump damper chamber, said piston rod being fixed with respect to the other of said strut parts whereby said pump damper piston will move within said pump damper chamber in response to the telescopic movement of said strut parts, passage means intercommunicating the ends of said pump damper chamber on opposite sides of said pump damper piston, and means communicating said pump damper chamber with said hydraulic strut chamber.

15. A strut as defined in claim 14 including a high pressure container having pressure responsive means therein dividing the same into a high pressure hydraulic chamber and a high pressure gas chamber, means communicating said cylinder with said high pressure hydraulic chamber including valve means preventing direct flow of hydraulic fluid from said high pressure hydraulic chamber to said cylinder, and means communicating said low pressure hydraulic chamber with said cylinder including valve means preventing direct flow of hydraulic fluid from said cylinder to said low pressure hydraulic chamber.

16. A strut as defined in claim 15 including a leveling valve mechanism operatively connected between said hydraulic strut chamber and said high and low pressure hydraulic chambers, and means operable in response to the simultaneous telescoping movement of said strut and pump parts for actuating said valve mechanism to the communication between said strut hydraulic chamber and both of said high and low pressure hydraulic chambers when said parts are disposed in a predetermined position with respect to each other, to permit communication between said high pressure hydraulic chamber and said strut hydraulic chamber when said parts are telescoped inwardly beyond said predetermined position and to permit communication between said low pressure hydraulic chamber and said strut hydraulic chamber when said parts are telescoped outwardly beyond said predetermined position.

17. A self damping load supporting strut adapted to be connected between the sprung and unsprung masses of a vehicle comprising a tubular casing having an end closure member on one end thereof, the opposite end portion of said casing providing an axially elongated annular interior sealing surface, a tubular plunger member mounted in telescoping relation to said casing and having an axially elongated exterior sealing surface adjacent the inner end portion thereof disposed in spaced relation to said interior sealing surface and an end closure member on the outer end thereof, a sleeve seal having opposite ends thereof fixed respectively to said casing and said plunger member and folded intermediate its ends between said annular surfaces in rolling contact therewith, a sleeve of flexible material within said casing dividing the interior space defined by said casing, said plunger member, said end closure members and said seal into an outer annular air chamber and an inner hydraulic chamber; a pump damper cylinder disposed within said hydraulic chamber having one end thereof fixed to one of said end closure members; a pump damper piston slidably mounted within said cylinder; a piston rod fixed to said piston and extending from one side thereof outwardly of said cylinder, the outwardly extending end of said piston rod being fixed to the other of said end closure members; passage means communicating the ends of said cylinder on opposite sides of said piston; and means communicating said cylinder with said hydraulic chamber.

18. A strut as defined in claim 17 wherein said interior and exterior sealing surfaces are cylindrical.

19. A strut as defined in claim 17 wherein said interior sealing surface includes an intermediate outwardly diverging frusto-conical portion and inner and outer cylindrical portions.

20. A strut as defined in claim 17 wherein said passage means comprises a first passage in said piston having pressure responsive valve means therein operable to open in response to an increase in pressure in the piston rod side of said cylinder to permit flow from the piston rod side of said cylinder to the opposite side thereof and a second passage in said piston having pressure responsive valve means therein operable to open in response to an increase in pressure in the opposite side of said cylinder to permit flow from the opposite side of said cylinder to the piston rod side thereof.

21. A strut as defined in claim 17 wherein said means communicating said cylinder with said hydraulic chamber comprises a first passage in said plunger end member having pressure responsive valve means therein operable to open in response to an increase in pressure in the cylinder on the side of the piston opposite from the piston to permit flow outwardly of said cylinder into said strut chamber and a second passage in said plunger end member operable to open in response to a decrease in the pressure in said opposite cylinder side to permit flow from said strut hydraulic chamber to said cylinder.

22. A strut as defined in claim 17 wherein said tubular casing includes an outer tubular casing member having said casing end member closing one end thereof and an inner tubular casing member having one end fixed adjacent the opposite end of said outer casing member and extending inwardly of the latter, said inner casing member defining said interior sealing surface.

23. A strut as defined in claim 22 wherein said inner and outer casing members are fixed together by means of a rigid closure ring, said ring and said casing and closure member having annular grooves formed in the peripheries thereof, each of said annular grooves receiving one end of said sleeve of flexible material, an O-ring surrounding each end of said sleeve of flexible material retaining the same in the associated groove, the adjacent extremity of the sleeve of flexible material being folded over the associated O-ring, the ends of said outer casing engaging the folded over extremities of said sleeve of flexible material.

24. A strut as defined in claim 17 wherein said exterior sealing surface includes an intermediate inwardly diverging frusto-conical portion and inner and outer cylindrical portions.

25. A strut as defined in claim 24 wherein said interior sealing surface includes an intermediate outwardly diverging frusto-conical portion and inner and outer cylindrical portions.

26. A self damping load supporting strut adapted to be connected between the sprung and unsprung masses of a vehicle comprising a tubular casing having an end closure member on one end thereof, the opposite end portion of said casing providing an axially elongated annular interior sealing surface, a tubular plunger member mounted in telescoping relation to said casing and having an axially elongated exterior sealing surface adjacent the inner end portion thereof disposed in spaced relation to said interior sealing surface and an end closure member on the outer end thereof, a sleeve seal having opposite ends thereof fixed respectively to said casing and said plunger member and folded intermediate its ends between said annular surfaces in rolling contact therewith, sealing means within said casing dividing the interior space defined by said casing, said plunger member, said end closure members and said seal into an air chamber defined at least in part by the interior periphery of said casing and a hydraulic chamber defined at least in part by the interior periphery of said plunger member; a damper cylinder disposed within said hydraulic chamber having one end thereof fixed to one of said end closure members; a damper piston slidably mounted within said cylinder; a piston rod fixed to said piston and extending from one side thereof outwardly of said cylinder, the outwardly extending end of said piston rod being fixed to the other of said end closure members; passage means communicating the ends of said cylinder on opposite sides of said piston; and means communicating said cylinder with said hydraulic chamber.

27. A self damping load supporting strut adapted to be connected between the sprung and unsprung masses of a vehicle comprising a tubular casing having an end closure member on one end thereof, a tubular plunger member mounted in telescoping relation to said casing and having an end closure member on the outer end thereof, a sleeve seal having opposite ends thereof fixed respectively to said casing and said plunger member and folded intermediate its ends, sealing means within said casing dividing the interior space defined by said casing, said plunger member, said end closure members and said seal into an air chamber defined at least in part by the interior periphery of said casing and a hydraulic chamber defined at least in part by the interior periphery of said plunger member; a damper cylinder disposed within said hydraulic chamber having one end thereof fixed to one of said end closure members; a damper piston slidably mounted within said cylinder; a piston rod fixed to said piston and extending from one side thereof outwardly of said cylinder, the outwardly extending end of said piston rod being fixed to the other of said end closure members; passage means communicating the ends of said cylinder on opposite sides of said piston; and means communicating said cylinder with said hydraulic chamber.

References Cited in the file of this patent

UNITED STATES PATENTS

| | | |
|---|---|---|
| 2,630,834 | Weber | Mar. 10, 1953 |
| 2,670,759 | St. Clair | Mar. 2, 1954 |
| 2,757,376 | Brueder | July 31, 1956 |
| 2,781,778 | Lisciani | Feb. 19, 1957 |
| 2,786,488 | Mercier | Mar. 26, 1957 |
| 2,802,664 | Jackson | Aug. 13, 1957 |
| 2,825,579 | Heiss | Mar. 4, 1958 |
| 2,937,034 | Langen | May 17, 1960 |